(12) United States Patent
DeWaard

(10) Patent No.: US 10,933,359 B2
(45) Date of Patent: Mar. 2, 2021

(54) FEED SYSTEMS AND METHODS FOR ROTARY SCREEN SEPARATORS

(71) Applicant: Daritech, Inc., Lynden, WA (US)

(72) Inventor: David DeWaard, Lynden, WA (US)

(*) Notice: Subject to any disclaimer, the term of this patent is extended or adjusted under 35 U.S.C. 154(b) by 0 days.

(21) Appl. No.: 16/372,198

(22) Filed: Apr. 1, 2019

(65) Prior Publication Data
US 2019/0224595 A1    Jul. 25, 2019

Related U.S. Application Data

(63) Continuation of application No. 14/722,590, filed on May 27, 2015, now Pat. No. 10,286,340.

(60) Provisional application No. 62/003,490, filed on May 27, 2014.

(51) Int. Cl.
| B01D 33/11 | (2006.01) |
| B01D 33/50 | (2006.01) |
| B01D 33/72 | (2006.01) |
| B01D 33/067 | (2006.01) |
| B01D 33/80 | (2006.01) |

(52) U.S. Cl.
CPC ............ B01D 33/11 (2013.01); B01D 33/067 (2013.01); B01D 33/50 (2013.01); B01D 33/72 (2013.01); B01D 33/801 (2013.01)

(58) Field of Classification Search
CPC ........ B01D 33/11; B01D 33/50; B01D 33/72; B01D 33/067; B01D 33/801; B01D 29/90
See application file for complete search history.

(56) References Cited

U.S. PATENT DOCUMENTS

| 3,626,486 A * | 12/1971 | Bugbee | B01D 33/19 |
| | | | 210/405 |
| 4,507,202 A * | 3/1985 | Nord | B01D 33/72 |
| | | | 210/391 |
| 2013/0299395 A1 * | 11/2013 | DeWaard | B03B 5/56 |
| | | | 209/235 |

* cited by examiner

Primary Examiner — Liam Royce

(57) ABSTRACT

A feed system for a rotary screen separator has a feed housing and a feed lid movably attached to the feed housing. The feed housing has a feed chamber, an inlet opening, and an outlet opening. The feed chamber defines a proximal portion adjacent to the inlet opening and a distal portion at least a portion of which is adjacent to the an outlet opening. A cross-sectional area of at least a portion of the proximal portion is greater than a cross-sectional area of the distal portion. The feed lid is movably attached to the feed housing such that the feed lid covers the outlet opening in a closed position, and does not cover the outlet opening in at least one open position.

10 Claims, 18 Drawing Sheets

FEED SYSTEMS AND METHODS FOR ROTARY SCREEN SEPARATORS

PRIORITY CLAIM

The instant application, U.S. patent application Ser. No. 16/372,198, filed on Apr. 1, 2019, is a continuing application claiming priority to U.S. patent application Ser. No. 14/722,590 filed 27 May 2015, issued as U.S. Pat. No. 10,286,340, which, itself, claims benefit of U.S. Provisional Application Ser. No. 62/003,490 filed 27 May 2014, the contents of which are incorporated herein by reference.

FIELD OF THE INVENTION

This disclosure relates to the field of rotary separators and, more particularly, to feed systems for rotary separators that are used to separate effluent into different fractions depending upon the volume of the solid components.

BACKGROUND OF THE INVENTION

Rotary screen separators are often used to process effluent such as waste from a dairy operation. Generally speaking, rotary screen separators separate a feed material into solid and liquid components by displacing the feed material along a first side of a screen such that solid material remains on the first side and liquid material passes through perforations in the screen to a second side thereof.

Conventionally, rotary screen separators employ a screen having a single predetermined screen size. When a conventional rotary screen is provided with a screen having fine openings, very little solid material passes through the screen. However, a screen with fine openings also does not allow as much liquid material through the perforations as does a coarse screen. Conversely, a coarse screen allows an increased volume of liquid material to flow through the perforations, but a separator having a coarse screen may allow an undesirably high volume of the solids to escape with the increased volume of liquid material.

Conventional rotary screen separators employ a cylindrical feed tube configured to deposit the effluent in an inlet portion of the screen separator. The need exists for an improved rotary screen separator that optimizes the manner in which the effluent feed material is deposited within the separator to increase the efficiency by which the solids and water components of the feed material are separated.

SUMMARY OF THE INVENTION

The present invention may be embodied as a feed system for a rotary screen separator for processing feed material comprising liquids and solids, the feed system comprising a feed housing and at least one feed lid. The feed housing defines a feed chamber, an inlet opening, and at least one outlet opening. The feed chamber defines a proximal portion adjacent to the inlet opening and a distal portion at least a portion of which is adjacent to the at least one outlet opening. A cross-sectional area of at least a portion of the proximal portion is greater than a cross-sectional area of the distal portion. At least one feed lid is movably attached to the feed housing such that the at least one feed lid covers the at least one outlet opening in a closed position and does not cover the at least one outlet opening in at least one open position. Feed material introduced into the feed chamber through the at least one inlet opening acts on the at least one feed lid to force the at least one feed lid from the closed position to the at least one open position. The feed chamber is sized and dimensioned such that the feed material passes through the at least one inlet opening and is distributed throughout at least a portion of the rotary screen separator in a desired manner.

The present invention may also be embodied as a rotary screen separator for processing feed material comprising liquids and solids, the rotary screen separator comprising a separator member, a drive system, first and second vane structures, and feed system. The separator member defines a longitudinal axis, an input port, an output port, a first region, and a second region. The first region is arranged between the input port and the output port and the second region is arranged between the first region and the output port. The drive system rotates the separator member. The first vane structure is arranged in the first region, and the second vane structure is arranged in the second region. The feed system comprises a feed housing defining a feed chamber, an inlet opening, and at least one outlet opening. The feed chamber defines a proximal portion adjacent to the inlet opening and a distal portion at least a portion of which is adjacent to the at least one outlet opening. The cross-sectional area of at least a portion of the proximal portion is greater than a cross-sectional area of the distal portion. The at least one feed lid is movably attached to the feed housing such that the at least one feed lid covers the at least one outlet opening in a closed position and does not cover the at least one outlet opening in at least one open position. Feed material introduced into the feed chamber through the at least one inlet opening acts on the at least one feed lid to force the at least one feed lid from the closed position to the at least one open position. The feed chamber is sized and dimensioned such that the feed material passes through the at least one inlet opening and is distributed throughout at least a portion of the first region. Operation of the drive system to rotate the separator causes the first and second vane structures to displace the feed material through the first region and then through the second region. Operation of the drive system to rotate the separator causes the second vane structure to displace the feed material through the second region.

The present invention may also be embodied as a rotary screen separator for processing feed material comprising liquids and solids comprising a separator member, a drive system, and first and second vane structures. The separator member defines a longitudinal axis, an input port, an output port, a first region, and a second region. The first region is arranged between the input port and the output port and the second region is arranged between the first region and the output port. The drive system is for rotating the separator member. The first vane structure is arranged in the first region and defines a first vane height. The second vane structure is arranged in the second region and defines a second vane height, where the second vane height is greater than the first vane height. Operation of the drive system to rotate the separator causes the first vane structure to displace the feed material through the first region. Operation of the drive system to rotate the separator causes the second vane structure to displace the feed material through the second region. The second vane structure causes material to back up within the first region before entering the second region.

The present invention may also be embodied as a method of feeding material into a rotary screen separator for processing feed material comprising liquids and solids comprising the following steps. A feed housing defining a feed chamber, an inlet opening, and at least one outlet opening is provided. The feed chamber defines a proximal portion adjacent to the inlet opening and a distal portion at least a portion of which is adjacent to the at least one outlet opening. A cross-sectional area of at least a portion of the proximal portion is greater than a cross-sectional area of the distal portion. At least one feed lid is movably attached to the feed housing such that the at least one feed lid covers the at least one outlet opening in a closed position and does not cover the at least one outlet opening in at least one open position. Feed material is introduced into the feed chamber through the at least one inlet opening such that the feed material acts on the at least one feed lid to force the at least one feed lid from the closed position to the at least one open position. The feed chamber is sized and dimensioned such that the feed material passes through the at least one inlet opening and is distributed throughout at least a portion of the rotary screen separator in a desired manner.

DETAILED DESCRIPTION OF THE PREFERRED EMBODIMENT

A rotary screen separator is disclosed herein which may generally comprise a frame and a rotating perforated screen supported by the frame. In one form, the rotating screen is horizontally aligned at a slight angle and often comprises an internal screw flight. The screw flight is operatively configured to reposition the media to be separated from the input end of the separator to the solids discharge end. As the material moves through the screen separator, liquid and fine particles are removed through the perforations in the screen.

The example hybrid rotary screen separator of the present invention comprises at least two separate regions each comprising a different screen size. In the example hybrid rotary screen separator disclosed herein, the perforations of the screen on the input end of the separator comprise a much finer hole size than the perforations toward the solid discharge end. These regions of fine screen and coarse screen may be separate structures which may be interconnected, or may alternatively be a unitary structure with separate regions of varying screen sizes along the length. In one form, these are connected to the same cylinder-like structure.

The rotary screen separator of the present invention is adapted to process a high liquid content media (effluent) or feed material comprising both a solid component and a liquid component. As the feed material enters the fine portion of the screen, a percentage of the liquid is removed. As the feed material transfers to the coarse portion of the separator, more of the liquid is allowed to escape, while much of the fine solids remain and are intertwined with the coarse solids in a concentrated slurry.

In one example rotary screen separator of the present invention, the liquid escaping from or removed while the feed material moves through the fine portion comprises less solid content than the liquid escaping from or removed while the feed material moves through the coarse portion. The liquid removed in the fine portion and the liquid removed in the coarse portion define first and second filtrate streams, respectively. The separator of the present invention may be configured such that the first and second filtrate streams exit or are removed from the separator by way of separate discharge ports should an operator wish to keep the filtrate streams separated for later processing.

Figure 1:
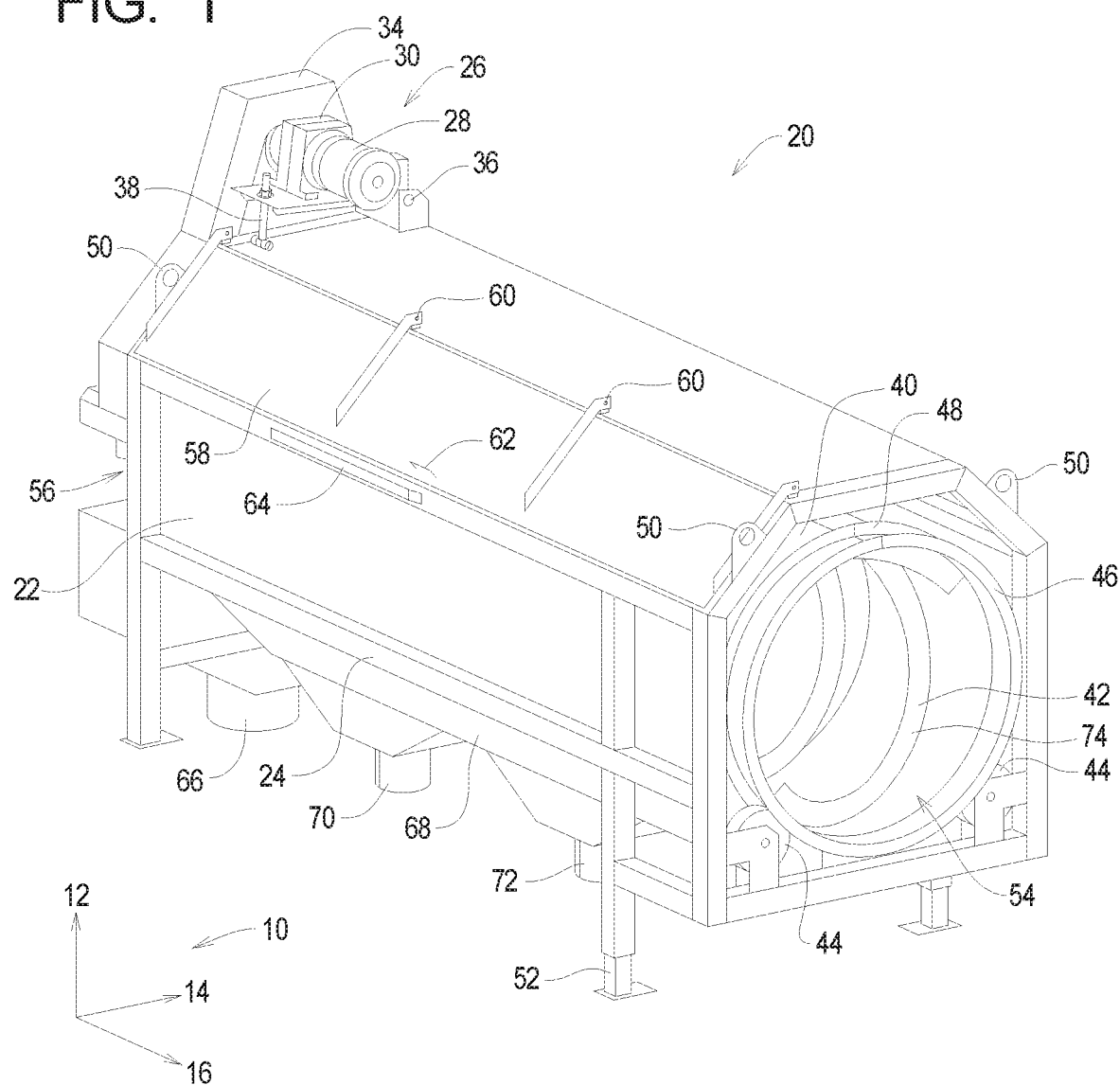
FIG. 1 is a perspective view from the output port end of a first example rotary screen separator of the invention.

With the foregoing general understanding of the construction and operation of the present invention in mind, an example hybrid rotary screen separator constructed in accordance with, and embodying, the principles of the present invention will now be described in detail with reference to FIGS. 1-9. Initially, depicted in FIG. 1 is an axes system 10 comprising a vertical axis 12, a transverse axis 14, and a longitudinal axis 16. The axes system 10 is to be used for description of the embodiments and is not per se part of the present invention.

Figure 2:
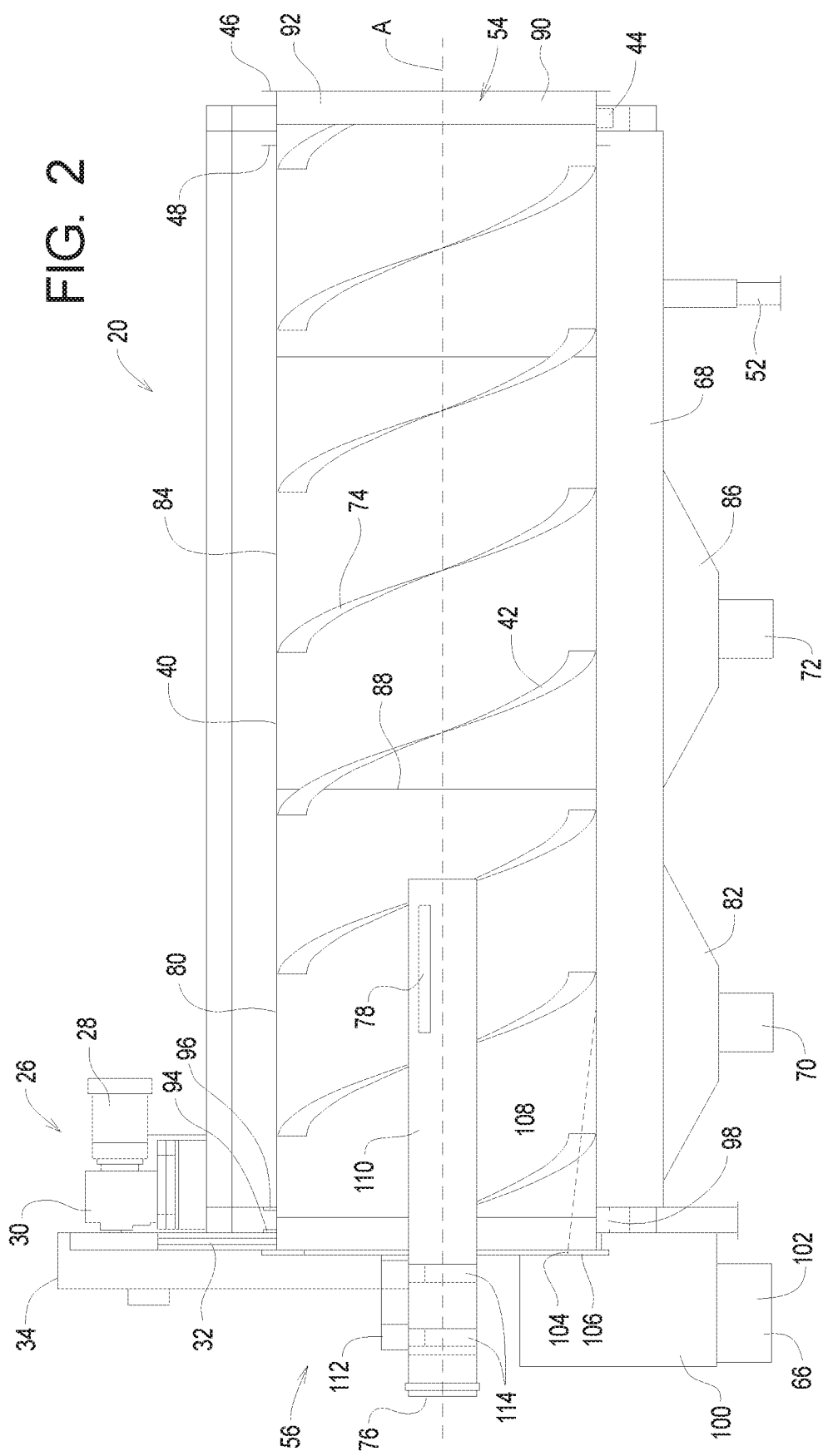
FIG. 2 is a cutaway side view of the first example rotary screen separator.

FIGS. 1 and 2 illustrate that an example hybrid rotary screen separator 20 of the present invention defines a system longitudinal axis A and generally comprises three major assemblies. The first assembly comprises a housing 22 and a frame 24. This housing and frame assembly generally supports and encloses the working portions of the separator 20.

The second assembly is the drive assembly 26 which generally comprises a drive motor 28, an optional reduction gear system 30, and a drive belt 32 which is shown in FIG. 2. In FIG. 1, the drive belt 32 is covered by a protective shroud 34. The motor 28 may be coupled to the housing 22 through a motor pivot 36 and drive tension adjuster 38.

The third assembly generally comprises a rotating screen 40. As will be described in further detail below, the example rotating screen 40 includes at least two different perforation regions. The example rotating screen 40 also comprises at least one vane 42. In one form, the rotating screen 40 is substantially cylindrical. The rotating screen 40 may be driven by the drive assembly 26 and in one form rests upon a plurality of support rollers 44. The support rollers 44 may be held in place, as shown for example in FIG. 1, by an outer flange 46 and an inner flange 48. Additional components, including additional support rollers 44, will be described below with reference to FIGS. 2 and 5 at the opposite longitudinal end of the separator 20.

To increase the portability of the separator 20, a plurality of lifting eyes 50 may be provided to facilitate connection of the separator 20 to a crane or the like (not shown) for moving and transportation thereof. Furthermore, a plurality of elevation adjusters 52 may be provided to allow the end user to adjust the elevation of the solid output end 54 relative to the input end 56.

The example separator 20 further comprises an access door 58 in the housing 22. The example access door 58 pivots between open and closed positions about a plurality of access door pivots 60 to facilitate access to the interior portion of the housing 22. A handle 62 may be provided for to facilitate lifting of the access door 58. The example access door 58 is further provided with a lid holder 64. The lid holder 64 may be rotated from a storage position as shown in FIG. 1 to a bracing position in which the lid holder 64 forms a strut that supports the access door 58 in an open configuration.

Several ports are formed on the lower portion of the separator 20. One such port is a bypass outflow port 66, which will be described in further detail below. A collection pan 68 may be provided at a bottom portion of the separator 20 to receive at least a portion of the fluid output from the rotating screen 40. The example collection pan 68 defines a fine material output 70 and a coarse material output 72 corresponding to the first and second filtrate streams, respectively, generally described above. As will be described in further detail below, the fluid output of or removed from the rotating screen 40 may be diverted to one of the fine material output 70 and the coarse material output 72.

Referring now to FIG. 2, depicted therein is a cut away view of the example separator 20 taken through the drive motor 28 and along the longitudinal axis 16 and vertical axis 12. FIG. 2 further illustrates that the vanes 42 form a screw flight 74.

As generally discussed above, the example rotating screen 40 generally comprises at least two unique perforation regions. The example rotating screen 40 comprising two separate and distinct perforation regions; however, more than two unique perforation regions can also be utilized.

Figure 3:
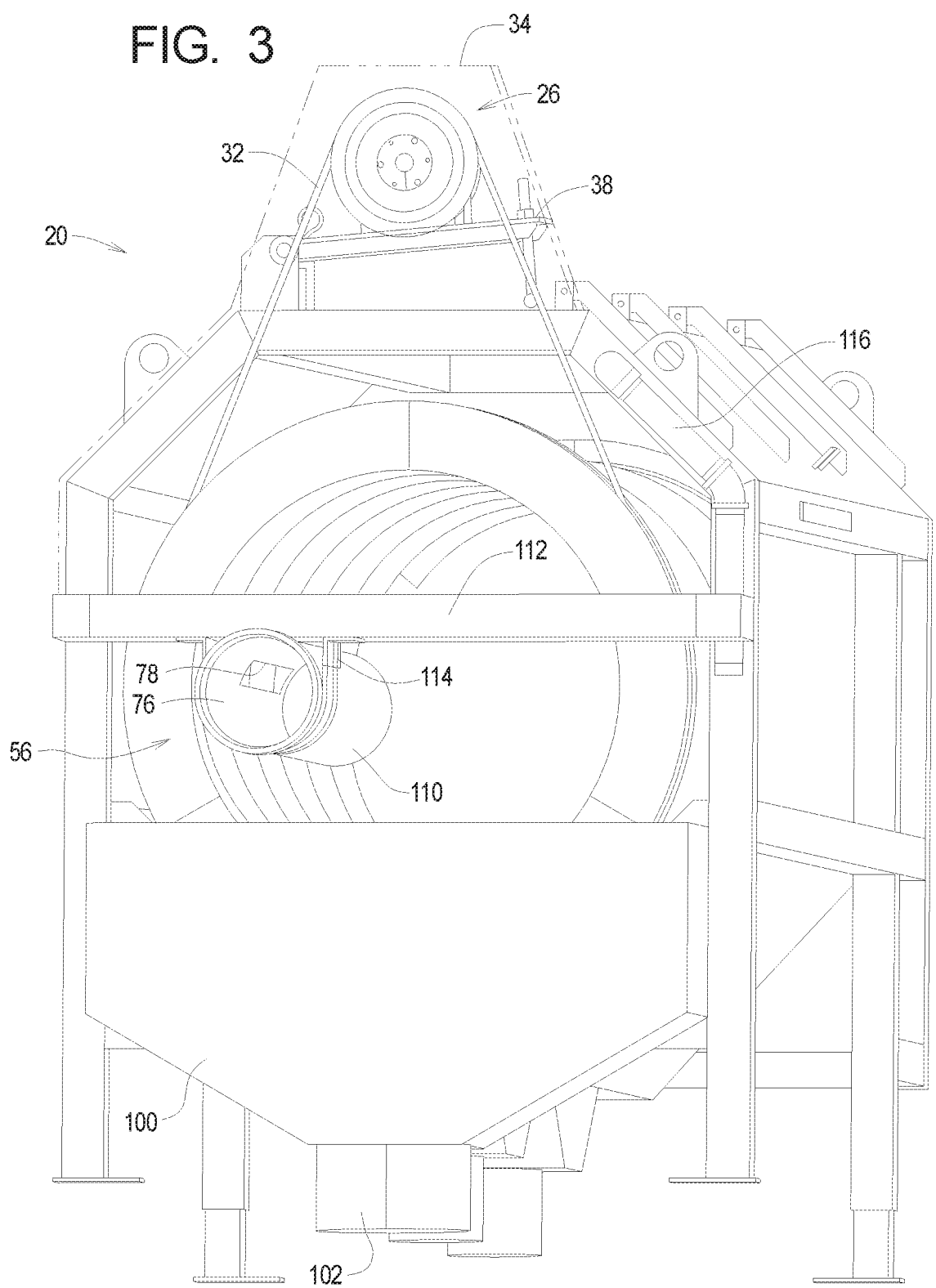
FIG. 3 is a perspective view from the input end of the first example rotary screen separator.
Figure 4:
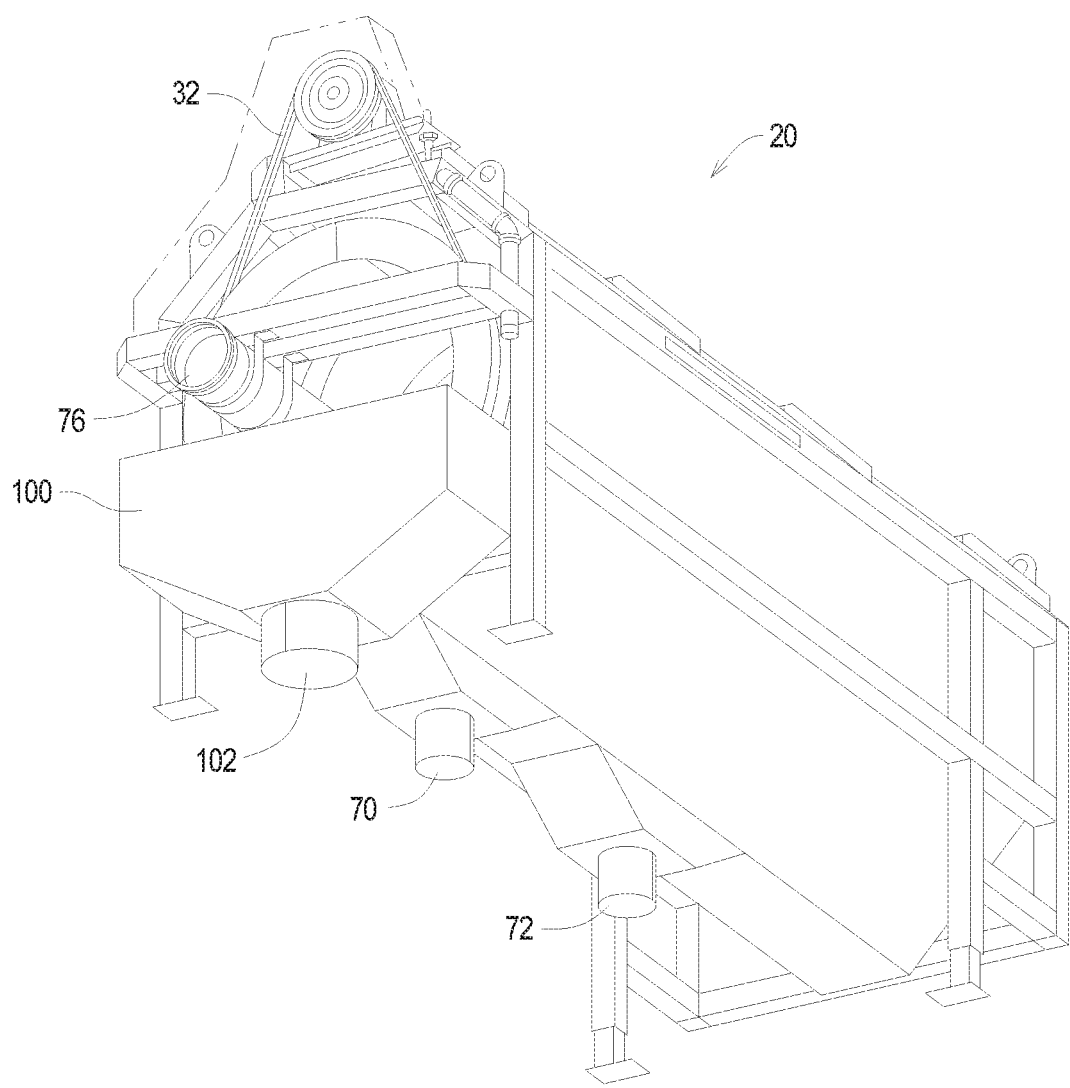
FIG. 4 is a perspective view of the underside of the first example rotary screen separator from a first perspective.

As feed material enters an example input port 76, the feed material is pressed towards a feed slot 78 (FIGS. 2 and 3). The feed material eventually exits the feed slot 78 into a fine perforation region 80 within the rotating screen 40. A portion of the liquid and some of the fine materials exit the interior of the rotating screen through the perforations in this fine perforation region 80. The material passing through the fine perforations generally redistribute toward a fine collection pan 82 and exit through the fine material output 70.

Coarser materials in the feed material that are not removed by the rotating screen 40 in the fine perforated region 80, along with fluid remaining in the feed material, are displaced away from the input port 76 by the screw flight 74 as the rotating screen 40 rotates about the longitudinal system axis A. The coarser material and liquid remaining in the feed material is thus displaced or otherwise redistributed toward the output end 54 and thus enters a coarse perforation region 84. More of the fluids and a portion of the coarser materials remaining in the feed material exit through the perforations in the coarse perforation region 84 and are collected in the collection pan 68. The coarse materials in one form reposition into the coarse collection pan 86, wherein they exit the separator 20 via the coarse material output 72.

The example rotating screen 40 is formed by two separate screens with different screen sizes, and a seam 88 is formed in the example rotating screen 40 between the fine perforation region 80 and the coarse perforation region 84. Alternatively, the cylinder formed by the rotating screen 40 may be formed from a single sheet of material and thus may be seamless.

A highly coarse portion of the feed material (i.e., has not exited through the perforations in either the fine perforation region 80 or the coarse perforation region 84) is displaced or redistributed toward the output end 54 and exits the separator 20 at a very coarse material output 90. Typically, the highly coarse portion of the feed material is collected at the coarse material output 90.

Adjacent to the example very coarse material output 90 are flanges 46 and 48 that support an additional set of rollers or idler wheels 44 that maintain position of the rotating screen 40 as generally described above. The region of the rotating screen 40 between the flanges 46 and 48 may comprise a solid region 92, which is generally not perforated. At the opposite end of the rotating screen 40, an outer flange 94 and inner flange 96 maintain position of the rotating screen 40 upon another set of idler wheels 98, which are also coupled to the frame 24.

This example separator 20 disclosed herein allows for feed material to be processed at a much faster and more efficient rate than current single screen separators of the same size. Tests have shown that a physical implementation of the example separator 20 having a rotating screen 40 of approximately 3 feet in diameter and 10 feet in length that rotates in a first range of approximately 6 to 8 rpm can separate or process feed material at a rate of around 600 gallons per minute. The rotating screen 40 constructed as defined above may be rotated at a rate within a second range of approximately 3-15 rpm.

When run at a high rate, or with very dense input material, the fluid discharge to the collection pan 68 may overwhelm the capacity of the outputs 70 and 72. In this situation, a bypass collector 100 comprising a bypass outflow 102 may be employed as perhaps best shown in FIGS. 8 and 9. The bypass collector 100 defines an upper lip 104 formed by a bypass flange 106. As material within the collection pan 68 builds up towards the input end 56 of the separator 20, material within the collection pan 68 may build up beyond a maximum fill level 108 defined by the upper lip 104 of the bypass flange 106 as shown in FIG. 2.

As the material within the collection pan 68 exceeds the maximum fill level 108, a liquid portion of this material flows over the upper lip 104 of the bypass flange 106 and into the bypass collector 100. This bypass collector 100 is depicted in perspective in FIG. 3, and the upper lip 104 of the bypass flange 106 is visible in FIG. 7. The outflow exiting the bypass outflow 102 may be fed by way of a gravity drain or other systems and return to the source of the media to be separated, such as a settling pond.

FIG. 3 shows the input end 56 of the example separator 20 in further detail and illustrates the shroud 34 (phantom line) and the example drive tension adjuster 38 and example drive belt 32. FIG. 3 further shows that the input port 76 is defined by an input tube 110. The example input tube 110 is coupled to a cross frame member 112 in the example separator 20. The cross frame member 112 further supports the shroud 34 and the input tube 110 by way of brackets 114 and supports the inlet tube. FIG. 3 also shows a water supply line 116 which will be described in further detail below.

Figure 5:
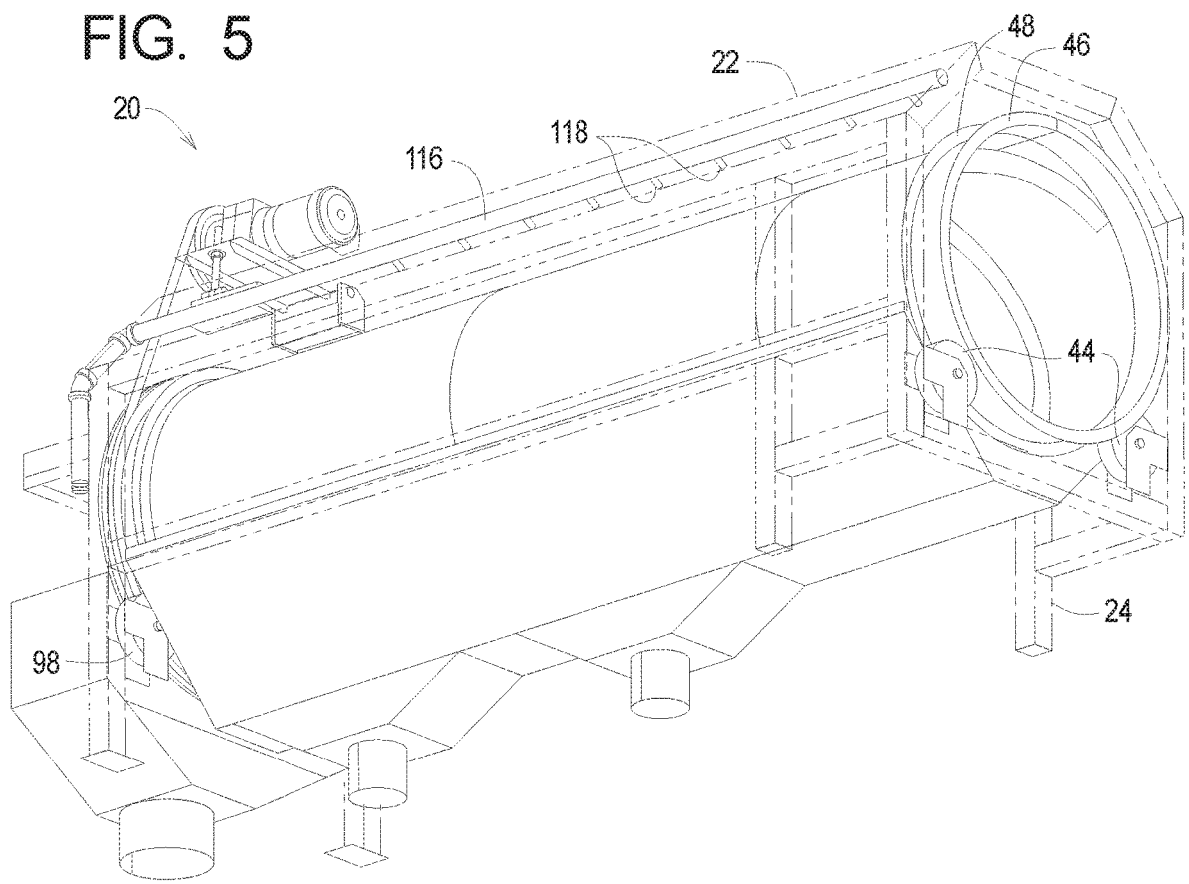
FIG. 5 is a perspective hidden line view of the underside of the first example rotary screen separator from a second perspective.
Figure 6:
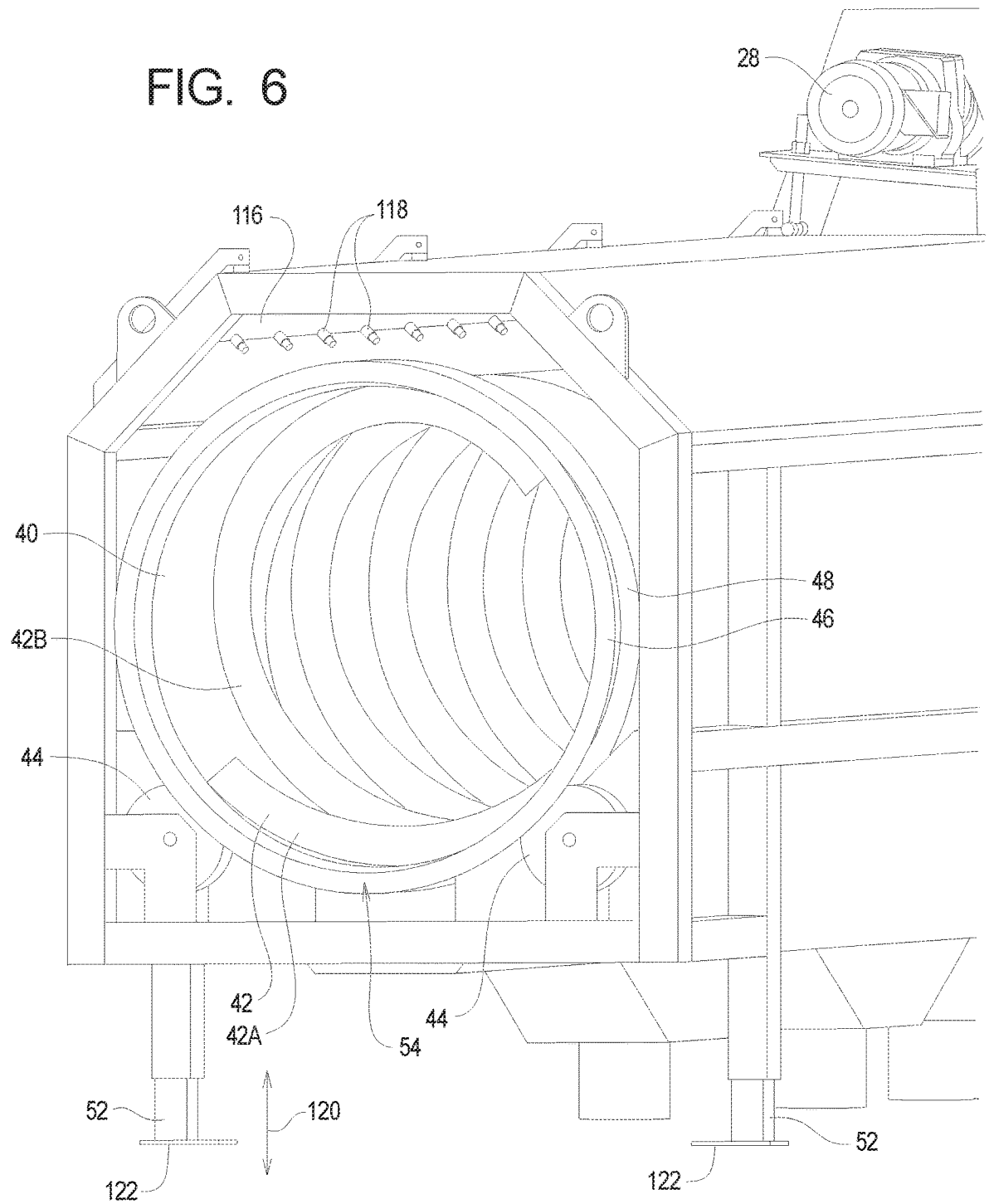
FIG. 6 is a perspective detail view of the output end of a rotary screen separator in one form.
Figure 7:
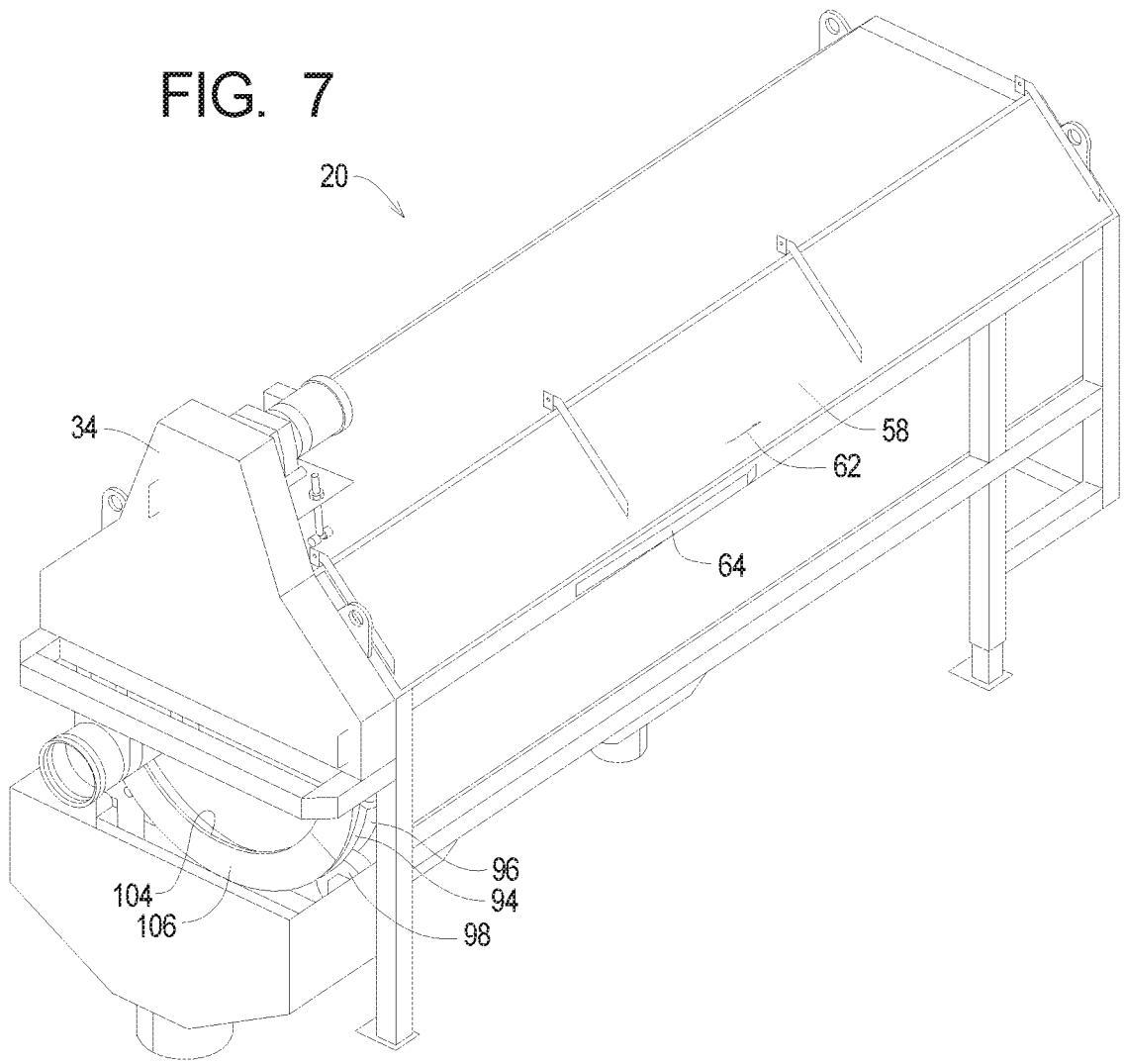
FIG. 7 is a perspective top view of the first example rotary screen separator.
Figure 8:
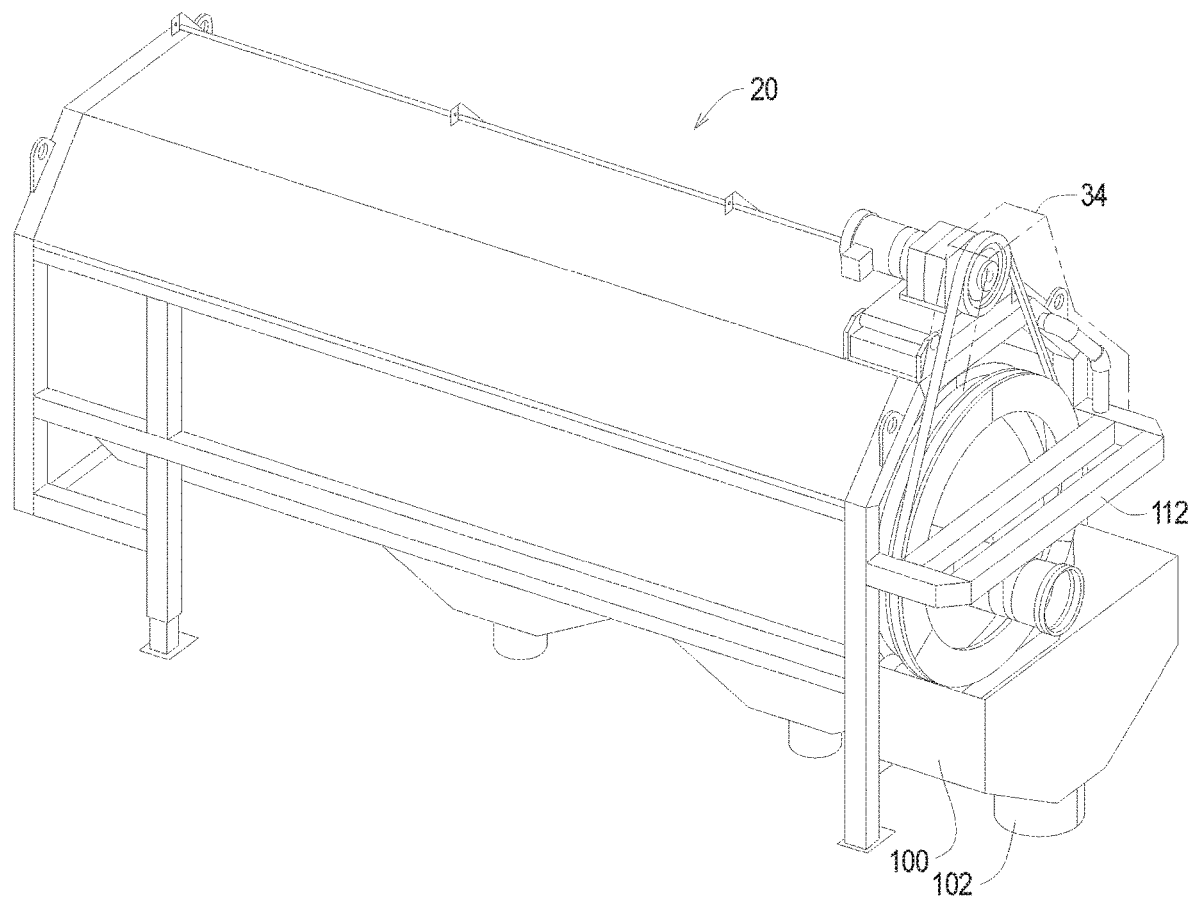
FIG. 8 is a partial hidden line view of the input end of the first example rotary screen separator.

FIG. 5 shows the example separator 20 with the housing 22 and frame 24 depicted by phantom lines to allow the support rollers or idler wheels 44 and corresponding flanges 48 and 46 to be seen more clearly. FIG. 5 further shows that the example separator 20 further comprises a water supply line 116 that is coupled to a plurality of sprinklers 118. These sprinklers 118 allow the separator 20 to be operated in a self-cleaning mode in which water from the sprinklers 118 cleans the rotating screen 40. FIG. 6 also shows the water supply line 116 and sprinklers 118, but from the output end 54. FIG. 6 also illustrates that the vanes 42 may be formed by a plurality of helical vanes 42A and 42B.

FIG. 6 also shows the elevation adjusters 52. The elevation adjusters 52 of the example separator 20 allow the output end 54 to be elevated above the input end 56 with reference to a horizontal plane. The example elevation adjusters 52 thus allow a user to vary the elevation height 120 of the output end 54 above the feet 122 of the separator 20. A slight incline of the rotating screen 40 increases the efficiency of the overall apparatus. However, the separator 20 may be configured to operate anywhere between a horizontal or level orientation (0° with respect to horizontal) or may be inclined up to 5° from horizontal. Stated alternatively, in the physical embodiment of the example separator 20 as described above (a device of 10' in overall length), the output end may be raised approximately 4" above the input end.

In one form, inclining the device from horizontal improves efficiency, while an incline in a first range of substantially between 0° and 5° of a screen rotating at 3-15 rpm and having a diameter of about 3' may be preferred for common effluent consistencies although other dimensions and rates will be used in other applications. In another form, the screen 40 may be inclined at an angle in a second range of substantially between 1° and 10°.

Figure 9:
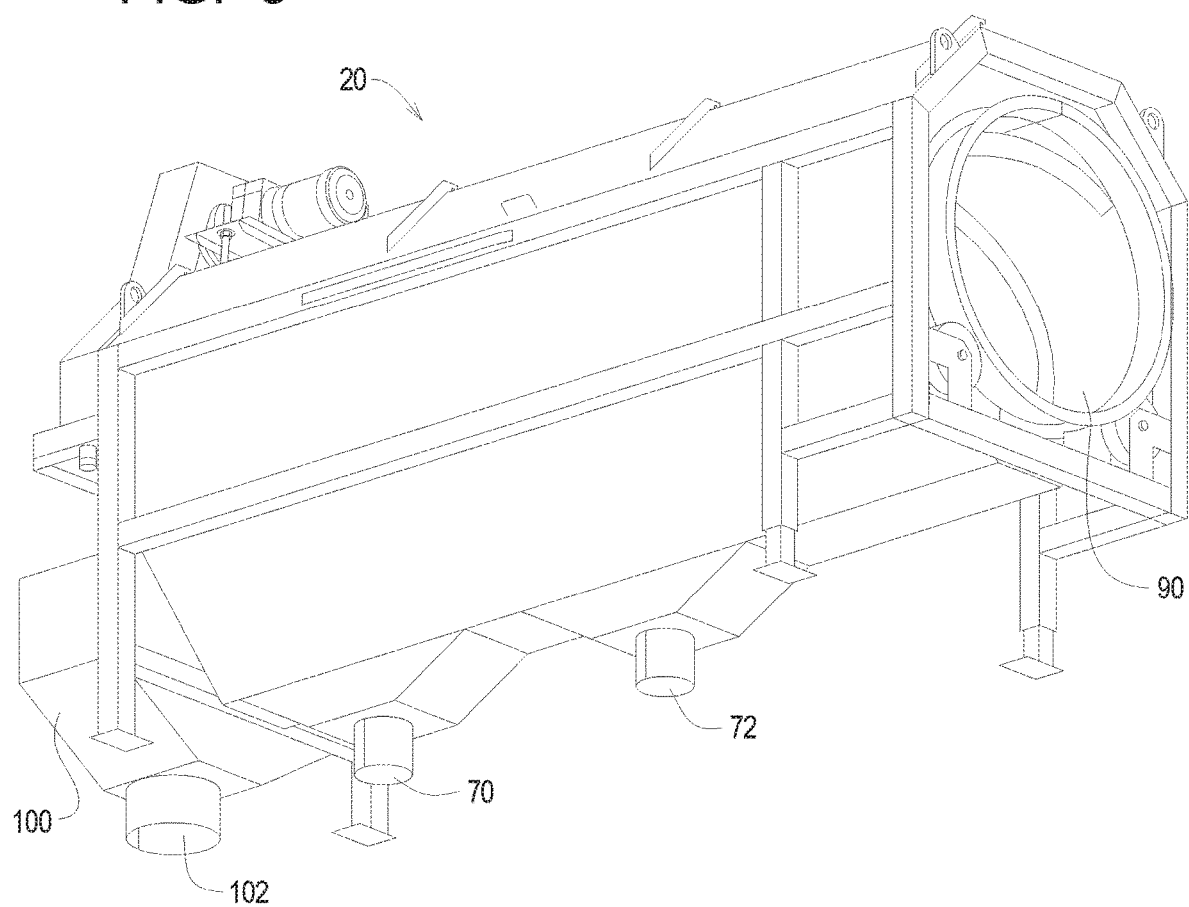
FIG. 9 is a perspective view of the underside of the first example rotary screen separator.

FIG. 9 illustrates that the example separator 20 defines four separate and distinct output ports for components or outflow material removed from the feed material. The output ports defined by the example separator 20 comprise, from left to right, the bypass outflow 102, the fine material output 70, the coarse material output 72, and the very coarse or solid material output 90. It may be desired to maintain the outflow material from each outflow port separately.

As examples, the outflow material exiting the bypass outflow 102 may be channeled back to the settling pond or other source. The fine material output 70 provides a substantially liquid media which can be used unprocessed or processed as required for a particular use. The outflow material flowing out of the coarse material output 72 contains substantially more solids than the outflow material flowing through the fine material output 70. The outflow material exiting the coarse material output 72 is thus more likely to require additional processing before this material can be reused. The outflow material exiting the very coarse material output 90 should be substantially solid and comprise a very small liquid component that can be used to the best advantage with or without additional processing as desired.

Figure 10:
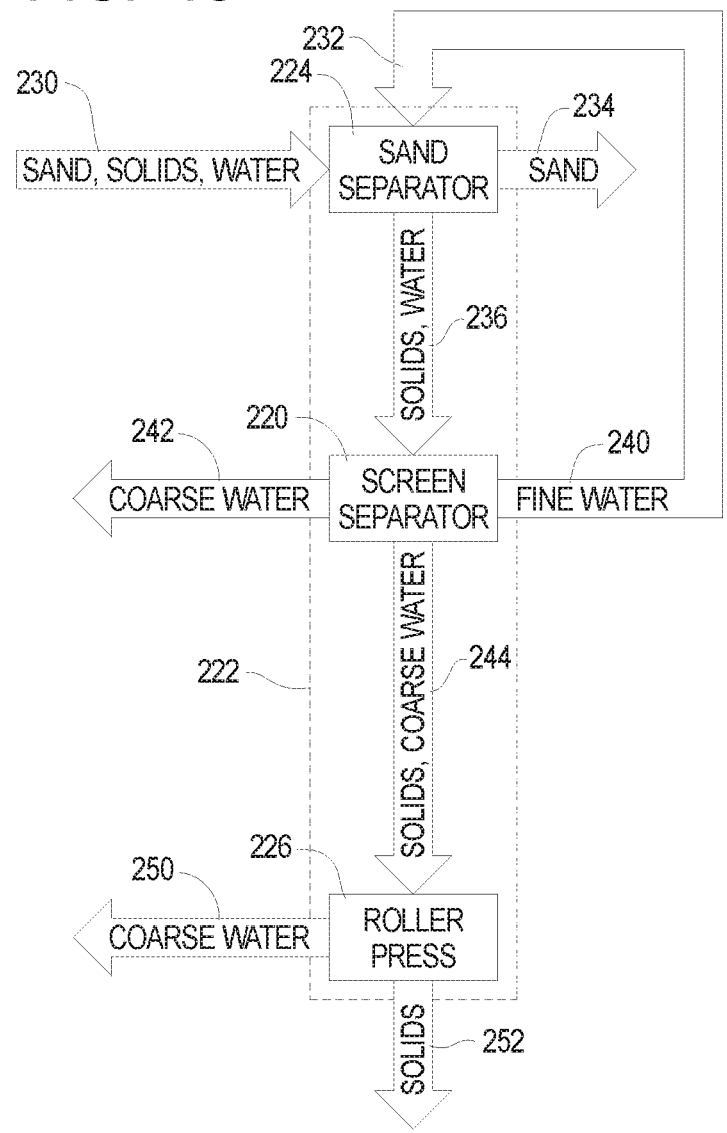
FIG. 10 is a block diagram of a first example waste processing system using a rotary screen separator of the present invention.

Referring now to FIG. 10 of the drawing, depicted therein is a second example hybrid rotary screen separator 220 of the present invention used as part of a first example waste processing system 222. The example hybrid rotary screen separator 220, which is depicted in further detail in FIG. 11, may be constructed to operate in a manner similar to that of the first example hybrid rotary screen separator 20 described above. The first example waste processing system 222 is described herein by way of example only, and the screen separator 220 may be used as described herein in many configurations of waste processing systems.

The principles of the present invention are of particular significance in the context of processing waste materials that are the byproduct of animal husbandry operations such as dairy farms, and that application of the present invention will now be described in further detail with reference to FIGS. 10 and 11.

Referring initially to FIG. 10 of the drawing, it can be seen that the first example waste processing system 222 comprises, in addition to the screen separator 220, a sand separator 224 and a roller press 226. The sand separator 224 may be a sand separator such as that described in copending U.S. patent application Ser. No. 13/351,214. The roller press 226 is or may be a conventional roller press available for use in the example waste processing system 222 as described herein.

The first example waste processing system 222 operates basically as follows. A first material 230 comprising sand, solids, and water is input to the sand separator 224. In a dairy operation, the first material 230 often contains sand because sand may be used as a bedding material for the cows. The water portion of the first material may be from rinse water, urine, or other water-based liquids used in a dairy operation. The solids are typically manure and uneaten food such as corn. Cleaning of dairy facilities creates a constant need to process the first material 230 so that its components may be reused, recycled, further processed, and/or disposed of as appropriate.

The sand separator 224 processes the first material, typically using water 232, into a second material 234 primarily comprising sand and a third material 236 primarily comprising solids and water. The second material 234 may be recycled for use as bedding material or otherwise appropriately reused or disposed of.

In the first example waste processing system 222, the third material 236 is input to the screen separator 220. The screen separator 220 processes the third material 236 to obtain a fourth material 240 commonly referred to as fine water, a fifth material 242 commonly referred to as coarse water, and a sixth material 244 primarily comprising solids and coarse water.

Fine water is a liquid that is primarily water and can be used with little or no processing in a modern dairy operation. In the first example waste processing system 222, the fourth material 240 is used as at least a portion of the water 232 used by the sand separator 224. Fine water typically has a first, relatively low, concentration of solids and/or other impurities.

Coarse water is a liquid comprising water and solids, and it is difficult to use coarse water in a modern dairy operation without additional processing. In the first example waste processing system 222, the fifth material 242 is typically stored for further processing and/or disposal as appropriate. Coarse water typically has a second, relatively high, concentration of solids and/or other impurities. The first concentration of solids associated with the fourth material 240 is thus typically significantly lower than the second concentration of solids associated with the fifth material 242.

The sixth material 244 is simply a combination of coarse water and the majority of the solids present in the third material 236 and has a third, very high, concentration of solids and/or other impurities. The second concentration of solids associated with the fifth material 242 is thus typically significantly lower than the third concentration of solids associated with the sixth material 244. It follows that the third concentration of solids is higher than the second concentration of solids and significantly higher than the first concentration of solids.

In the first example waste processing system 222, the sixth material 244 is input to the roller press 226. The roller press 226 processes the sixth material 244 to obtain a seventh material 250 primarily comprising fine water and an eighth material 252 primarily comprising solids, with very little liquid remaining in the eighth material 252. Like the fourth material 240, the seventh material 250 is typically appropriate for use in a dairy facility without further processing and may be used as at least a portion of the water 232 used by the sand separator 224. The eighth material 252 may be further processed by composting or in an anaerobic digester and may be reused as fertilizer and/or an energy source.

Figure 11:
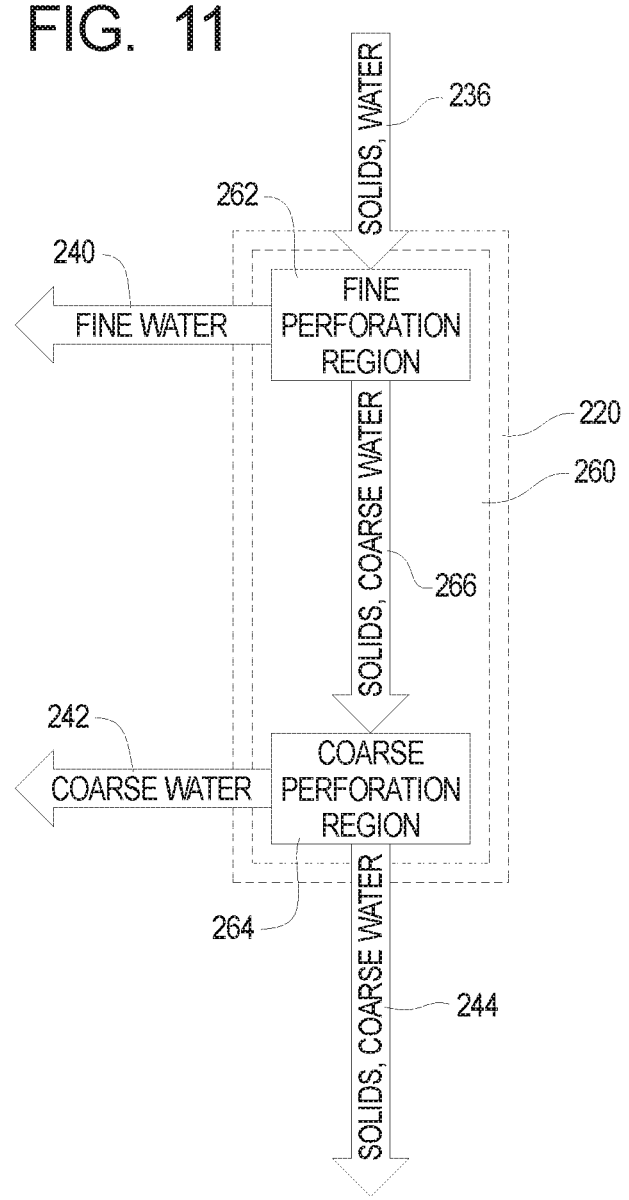
FIG. 11 is a block diagram of the rotary screen separator of the first example waste processing system.

FIG. 11 is a more detailed view of the example screen separator 220 depicted in FIG. 10. As shown in FIG. 11, the example screen separator 220 comprises a separator member or screen 260 defining a fine perforation region 262 and a coarse separation region 264.

The third material 236 is first processed by the fine perforation region 262 to obtain the fourth material 240 and a transition material 266 comprising solids and coarse water. The transition material 266 is then processed by the coarse perforation region 264 to obtain the fifth material 242 and the sixth material 244. A fourth concentration of solids associated with the transition material 266 is typically significantly higher than the first concentration of solids associated with the fourth material 240 and the second concentration of solids associated with the fifth material 242. However, the fourth concentration of solids associated with the transition material is typically significantly lower than the third concentration of solids associated with the sixth material 244.

Figure 12:
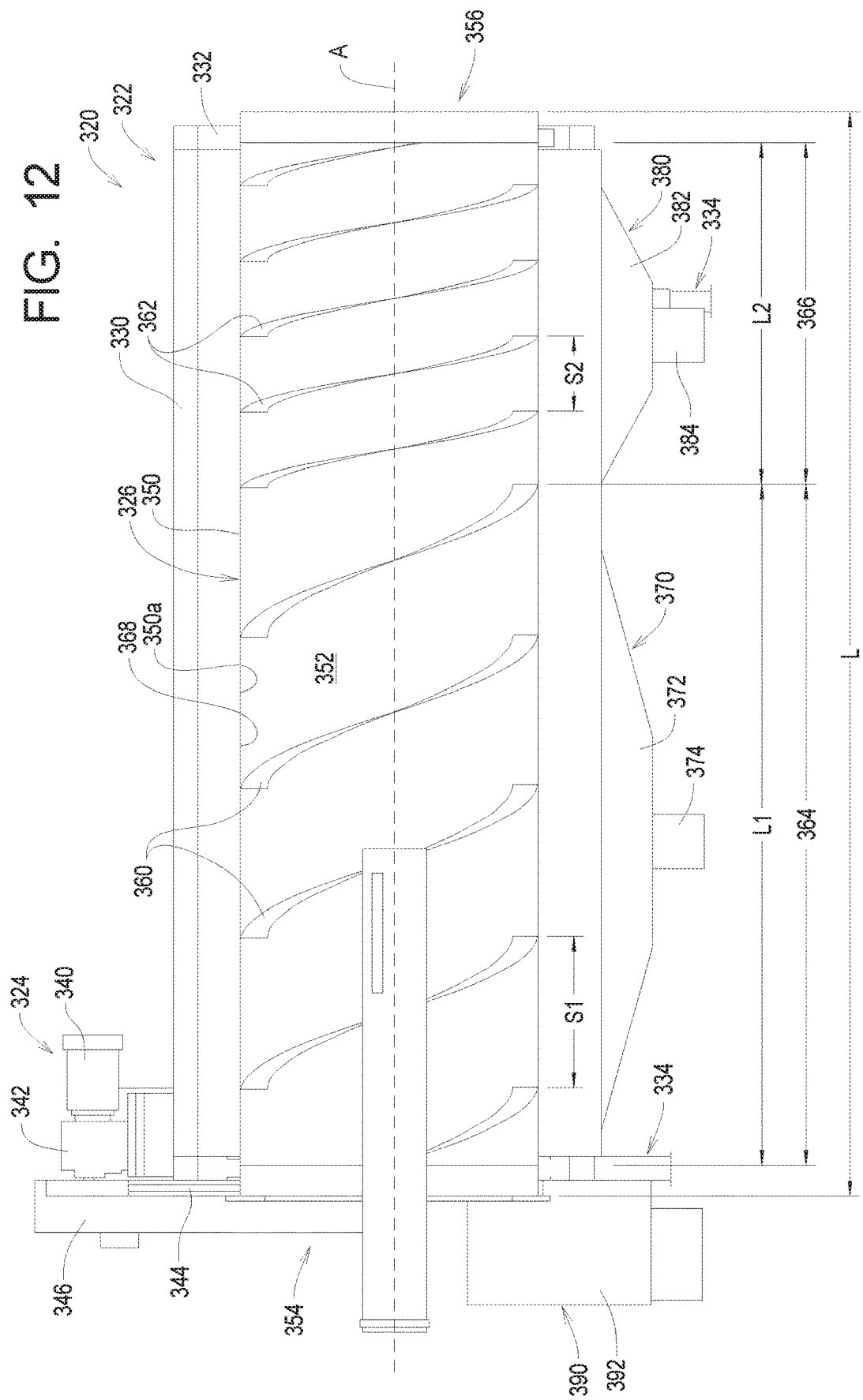
FIG. 12 is a cutaway side view of a second example rotary screen separator.

Turning now to FIG. 12 of the drawing, depicted at 320 therein is another example hybrid rotary screen separator system constructed in accordance with, and embodying, the principles of the present invention. The example separator system 320 defines a system longitudinal axis A and an overall length L. The example separator system 320 comprises a housing assembly 322, a drive system 324, and a screen assembly 326.

The housing assembly 322 comprises a housing 330, a frame 332, and one or more adjustment assemblies 334. This housing 330 encloses the working portions of the separator system 320, and the frame 332 supports the housing 330, the drive system 324, and the screen assembly 326 as will be described in further detail below. The housing 330 and frame 332 may be similar to or the same as the housing 22 and frame 24 described above and will not be described again in detail.

The example drive system 324 comprises a drive motor 340, an optional reduction gear system 342, and a drive belt 344. The drive system 324 may be similar to or the same as the drive assembly 26 described above. In particular, the drive belt 455 may be covered by a protective shroud 346, and the motor 340 may be coupled to the housing 330 through a motor pivot (not shown in FIG. 12) and drive tension adjuster (not shown in FIG. 12). The example drive system 324 will not be described in detail herein again.

The example screen assembly 326 comprises a screen structure or separator member 350 defining a separator chamber 352 having an input end 354 and an output end 356. The example screen structure 350 is substantially cylindrical, and a longitudinal axis of the screen structure 350 is aligned with the system axis A. Operation of the drive assembly 324 thus causes axial rotation of the screen structure 350 about the system axis A. The adjustment assembly or assemblies 334 allow adjustment of a height of the input end 354 relative to a height of the output end 356. Typically, the output end 356 will be higher than the input end 354.

The example screen assembly 326 further comprises first and second vane structures 360 and 362. A first perforation region 364 having a first perforation configuration is associated with the first vane structure 360, and a second perforation region 366 having a second perforation configuration is associated with the second vane structure 360. The first perforation configuration comprises a plurality of holes in the screen structure 350 that are sized, shaped, and spaced relative to each other to allow relatively fine particulate materials and liquids to pass from the separator chamber 352 to the exterior of the screen structure 350. The second perforation configuration comprises a plurality of holes in the screen structure 350 that are sized, shaped, and spaced relative to each other to allow relatively coarse particulate materials and liquids to pass from the separator chamber 352 to the exterior of the screen structure 350. As one example, relatively fine particulate materials may pass through an opening less than approximately 1 millimeter, while relatively coarser particulate materials may pass through an opening of approximately 10 millimeters.

The example first vane structure 360 defines a first spacing S1 and first length L1, and the second vane structure 362 defines a second spacing S2 and a second length L2. The first and second spacings S1 and S2 define a distance along the system axis between longitudinally and radially adjacent points on the vane structures 360 and 362. The first and second lengths L1 and L2 define an overall length of the vane structures 360 and 362, respectively, and may be expressed in nominal terms or as a percentage of the overall length L of the separator chamber 352. The first spacing S1 is typically greater than the second spacing S2.

The example first and second vane structures 360 and 362 are rigidly connected to an inner surface 368 of the screen structure 350. In particular, the example vane structures 360 and 362 are one or more sets of helical screw blades that extend radially inwardly from the screen structure inner surface 350a. As an alternative, the vane structures may be implemented as one or more sets of helical screw blades that extend radially outwardly from a shaft coaxially aligned with the screen structure 350.

The example vane structures 360 and 362 are each comprised of two continuous, offset screw blades, but it is also possible that the screw blades of one or both of these structures 360 and 362 may be made of discrete, discontinuous blade components. Additionally, a trailing edge of the blades of the example first vane structure 360 is contiguous with a leading edge of the blades of the second vane structure 362, but these structures 360 and 362 may be dis-contiguous with each other. In any arrangement, the purpose of the vane structures 360 and 362 is to displace material along the separator chamber 352 from the input end 354 to the output end 356 as will be described in further detail below.

Arranged below the screen assembly 340 are a first collection structure 370 defining a fine material chamber 372 in fluid communication with a fine material output port 374 and a second collection structure 380 defining a coarse material chamber 382 in fluid communication with a coarse material output port 384. Optionally, a single collection structure defining a single material output port may be arranged under the screen assembly. An overflow collection structure 390 defining an overflow material chamber 392 in fluid communication an overflow output port is arranged to collect liquids overflowing the fine material chamber 372.

The fine material chamber 372 is arranged below the first perforation region 364 of the screen structure 350 and is associated with the first filtrate stream generally described above. The coarse material chamber 382 is arranged below the second perforation region 366 of the screen structure 350 and is associated with the second filtrate stream generally described above. In particular, at least a portion of fluid material displaced along the separator chamber 352 by the vane structures 360 and 362 is diverted to the fine material output port 374 and the coarse material output port 384 to form the first and second filtrate streams, respectively.

The example hybrid rotary screen separator system 320 operates generally as follows. The drive system 324 is operated to cause axial rotation of the screen structure 350 and the vane structures 360 and 362 supported by the screen structure 350. Feed material is introduced into the separator chamber 352 through the input end 354. The first vane structure 360 displaces the feed material along the first perforation region 364 of the screen structure 350, and the second vane structure 362 displaces the feed material along the second perforation region 366 of the screen structure 350.

As the feed material is displaced through the separator chamber 352 along the first perforation region 364 of the screen structure 350, fine materials and liquids pass through the perforations in the screen structure 350 and are collected in the fine material chamber 372. Materials and liquids collected by the fine material chamber 372 pass through the fine material output port 374 for further processing as generally described above.

As the feed material continues through the separator chamber 352 and into the second perforation region 366 of the screen structure 350, coarser materials and liquids pass through the perforations in the screen structure 350 and are collected in the coarse material chamber 382. Materials and liquids collected by the coarse material chamber 382 pass through the fine material output port 384 for further processing as generally described above.

Liquids, primarily water, and some solids that have not passed through screen structure 350 in the perforation regions 364 and 366 will exit the separator chamber 352 through the output end 356 thereof. In practice, most of the solids passing through the separator chamber 352 collect at the bottom of the screen structure 350 in a wad or mat that is churned or rotated as the screen structure 350 rotates.

In the example separator system 320, the spacings S1 and S2 associated with the vane structures 360 and 362 are different, with the spacing S1 being greater than the spacing S2 as described above. The first vane structure 360 will thus displace material through the separator chamber 352 at a first material displacement rate that is greater than a second material displacement rate associated with the second vane structure 362. The first and second material displacement rates associated with the first and second vane structures 360 and 362 mean that the feed material moves more quickly along the first perforation region 364 than across the second perforation region 366.

As discussed above, the first perforation pattern associated with the first perforation region 364 allows liquids and finer particulate material to pass through the screen structure 350. The first material displacement rate is thus predetermined based on the first spacing S1 and the rate at which the screen assembly 326 is rotated as appropriate for the characteristics of the feed material and the first perforation pattern. Similarly, the second perforation pattern associated with the second perforation region 366 allows liquids and more coarse particulate material to pass through the screen structure 350. The second material displacement rate is thus predetermined based on the second spacing S2 and the rate at which the screen assembly 326 is rotated as appropriate for the characteristics of the feed material and the second perforation pattern.

In practice, the first material displacement rate may be high relative to the second material displacement rate and still allow much of the liquid and fine particulate material to be removed from the feed material along the first perforation region 364. After the feed material has moved along the first perforation region 364, however, much of the liquid and fine particulate material has been removed from the feed material.

Predetermining the second material displacement rate such that it is less than the first material displacement rate allows the material more time within the second perforation region 366. The second material displacement rate thus allows more of the remaining liquid and the coarse particulate material to be removed through the second perforation region 366 of the screen structure 350. The use of two different material displacement rates thus allows an overall length L of the system 320 to be kept to a minimum.

While the example hybrid rotary screen separator 320 employs two different perforation regions 364 and 366 and associated collection chambers 370 and 380, more than two different stages each comprising a perforation region and collection chamber may be provided for a particular operating environment. In this case, the spacings associated with each of the vane structures and the perforation patterns associated with each of the perforation regions would be predetermined to remove more particulate material of three different maximum sizes from the feed material. Typically, but not necessarily, the size of the particulate material will increase and the material displacement rate will decrease during each successive stage.

In addition, although the example hybrid rotary screen separator 320 employs two different perforation regions 364 and 366 with two different mesh sizes, a significant portion of the benefits of the use of two different regions can be obtained using a single mesh size. By the time the material being process passes from the first perforation region 364 to the second perforation region 366, much of the water within the processed material has been removed. The relatively smaller spacing between each of the adjacent vane structures in the second perforation allow the more time for the relatively smaller volume of fluid by percentage in the processed material within the second perforation region 366 to pass through the perforations, regardless of the size of the perforations relative to those of the first perforation region.

Figure 13:
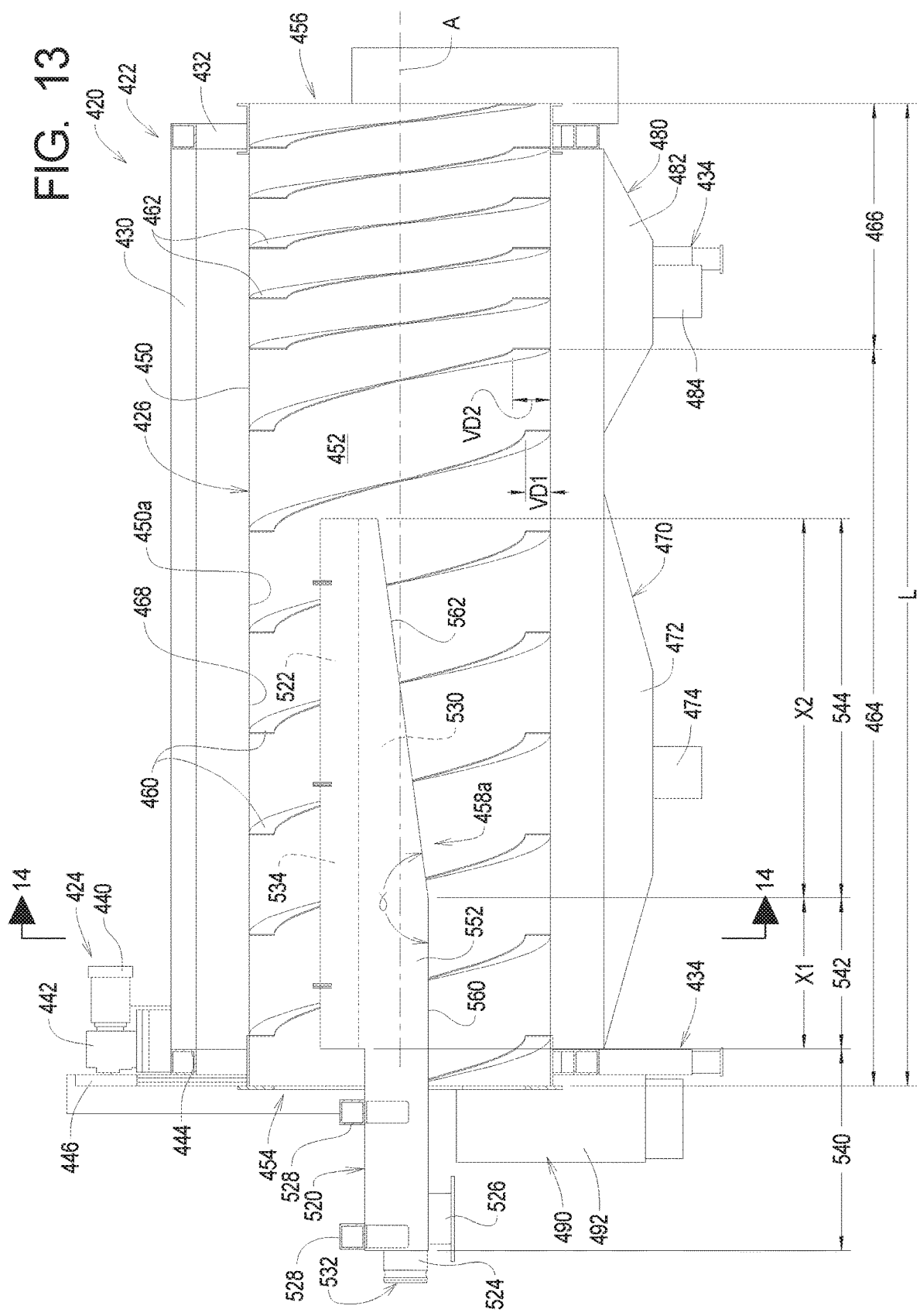
FIG. 13 is a cutaway side view of a third example rotary screen separator.

Turning now to FIG. 13 of the drawing, depicted at 420 therein is another example hybrid rotary screen separator system constructed in accordance with, and embodying, the principles of the present invention. The example separator system 420 defines a system longitudinal axis A and an overall length L. The example separator system 420 may be a hybrid rotary screen separator similar to the hybrid rotary screen separators 20, 220, and 320 described above. The example separator system 420 is depicting as a modification of the example separating system 320 described above and will be described herein only to that extent helpful for a complete understanding of the present invention.

The example separator system 420 comprises a housing assembly 422, a drive system 424, and a screen assembly 426. The housing assembly 422 comprises a housing 430, a frame 432, and one or more adjustment assemblies 434. This housing 430 encloses the working portions of the separator system 420, and the frame 432 supports the housing 430, the drive system 424, and the screen assembly 426 as will be described in further detail below. The housing 430 and frame 432 may be similar to or the same as the housing 22 and frame 24 described above and will not be described again in detail.

The example drive system 424 comprises a drive motor 440, an optional reduction gear system 442, and a drive belt 444. The drive system 424 may be similar to or the same as the drive assembly 26 described above. In particular, the drive belt 444 may be covered by a protective shroud 446, and the motor 440 may be coupled to the housing 430 through a motor pivot (not shown in FIG. 13) and drive tension adjuster (not shown in FIG. 13). The example drive system 424 will not be described in detail herein again.

Figure 14:
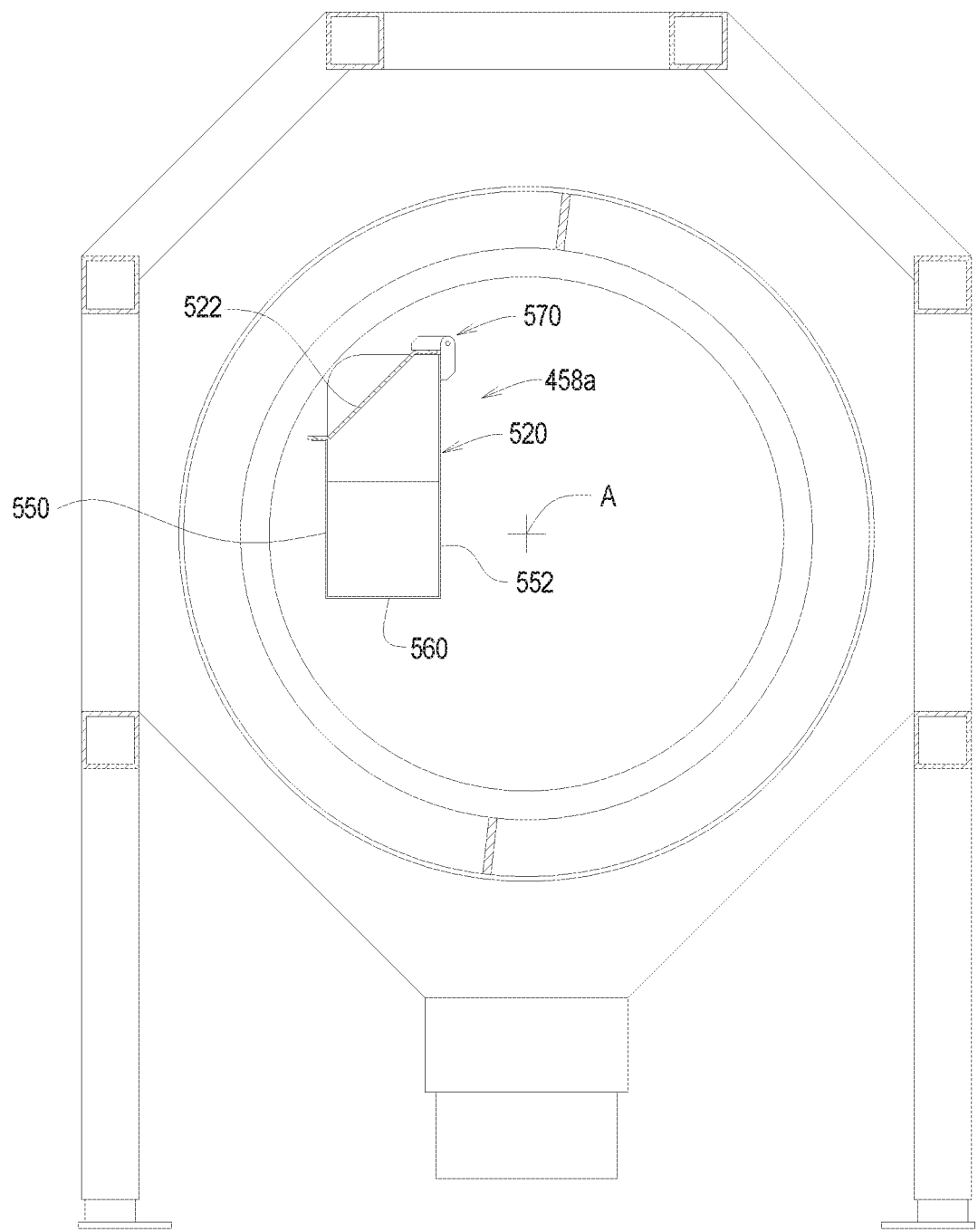
FIG. 14 is a section view taken along lines 14-14 in FIG. 13.

The example screen assembly 426 comprises a screen structure or separator member 450 defining a separator chamber 452 having an input end 454 and an output end 456. A feed assembly 458a is arranged at the input end 454 of the separator chamber 452. The example screen structure 450 is substantially cylindrical, and a longitudinal axis of the screen structure 450 is aligned with the system axis A. Operation of the drive assembly 424 thus causes axial rotation of the screen structure 450 about the system axis A. The adjustment assembly or assemblies 434 allow adjustment of a height of the input end 454 relative to a height of the output end 456. Typically, the output end 456 will be higher than the input end 454. As perhaps best shown in FIGS. 13 and 14, the example feed assembly 458a is arranged to extend in the same direction as the system axis A but is laterally offset relative to the system axis A.

The example screen assembly 426 further comprises first and second vane structures 460 and 462. A first perforation region 464 having a first perforation configuration is associated with the first vane structure 460, and a second perforation region 466 having a second perforation configuration is associated with the second vane structure 462. The first perforation configuration comprises a plurality of holes in the screen structure 450 that are sized, shaped, and spaced relative to each other to allow relatively fine particulate materials and liquids to pass from the separator chamber 452 to the exterior of the screen structure 450. The second perforation configuration comprises a plurality of holes in the screen structure 450 that are sized, shaped, and spaced relative to each other to allow relatively coarse particulate materials and liquids to pass from the separator chamber 452 to the exterior of the screen structure 450. As one example, relatively fine particulate materials may pass through an opening less than approximately 1 millimeter, while relatively coarser particulate materials may pass through an opening of approximately 10 millimeters.

The example first and second vane structures 460 and 462 are rigidly connected to an inner surface 468 of the screen structure 450. In particular, the example vane structures 460 and 462 are one or more sets of helical screw blades that extend radially inwardly from the screen structure inner surface 450a. As an alternative, the vane structures may be implemented as one or more sets of helical screw blades that extend radially outwardly from a shaft coaxially aligned with the screen structure 450.

The example vane structures 460 and 462 are each comprised of two continuous, offset screw blades, but it is also possible that the screw blades of one or both of these structures 460 and 462 may be made of discrete, discontinuous blade components. Additionally, a trailing edge of the blades of the example first vane structure 460 is contiguous with a leading edge of the blades of the second vane structure 462, but these structures 460 and 462 may be dis-contiguous with each other. In any arrangement, the purpose of the vane structures 460 and 462 is to displace material along the separator chamber 452 from the input end 454 to the output end 456 as will be described in further detail below.

Arranged below the screen assembly 440 are a first collection structure 470 defining a fine material chamber 472 in fluid communication with a fine material output port 474 and a second collection structure 480 defining a coarse material chamber 482 in fluid communication with a coarse material output port 484. Optionally, a single collection structure defining a single material output port may be arranged under the screen assembly. An overflow collection structure 490 defining an overflow material chamber 492 in fluid communication an overflow output port is arranged to collect liquids overflowing the fine material chamber 472.

The fine material chamber 472 is arranged below the first perforation region 464 of the screen structure 450 and is associated with the first filtrate stream generally described above. The coarse material chamber 482 is arranged below the second perforation region 466 of the screen structure 450 and is associated with the second filtrate stream generally described above. In particular, at least a portion of fluid material displaced along the separator chamber 452 by the vane structures 460 and 462 is diverted to the fine material output port 474 and the coarse material output port 484 to form the first and second filtrate streams, respectively.

The example hybrid rotary screen separator system 420 operates generally as follows. The drive system 424 is operated to cause axial rotation of the screen structure 450 and the vane structures 460 and 462 supported by the screen structure 450. Feed material is introduced into the separator chamber 452 through the input end 454 and, in particular, through the feed structure 458a. The first vane structure 460 displaces the feed material exiting the feed structure 458a along the first perforation region 464 of the screen structure 450, and the second vane structure 462 displaces the feed material along the second perforation region 466 of the screen structure 450.

As the feed material is displaced through the separator chamber 452 along the first perforation region 464 of the screen structure 450, fine materials and liquids pass through the perforations in the screen structure 450 and are collected in the fine material chamber 472. Materials and liquids collected by the fine material chamber 472 pass through the fine material output port 474 for further processing as generally described above.

As the feed material continues through the separator chamber 452 and into the second perforation region 466 of the screen structure 450, coarser materials and liquids pass through the perforations in the screen structure 450 and are collected in the coarse material chamber 482. Materials and liquids collected by the coarse material chamber 482 pass through the fine material output port 484 for further processing as generally described above.

Liquids, primarily water, and some solids that have not passed through screen structure 450 in the perforation regions 464 and 466 will exit the separator chamber 452 through the output end 456 thereof. In practice, most of the solids passing through the separator chamber 452 collect at the bottom of the screen structure 450 in a wad or mat that is churned or rotated as the screen structure 450 rotates.

In the example separator system 420, the first vane structure 460 will thus displace material through the separator chamber 452 at a first material displacement rate that is greater than a second material displacement rate associated with the second vane structure 462. The first and second material displacement rates associated with the first and second vane structures 460 and 462 mean that the feed material moves more quickly along the first perforation region 464 than across the second perforation region 466.

As discussed above, the first perforation pattern associated with the first perforation region 464 allows liquids and finer particulate material to pass through the screen structure 450. The first material displacement rate is thus predetermined and the rate at which the screen assembly 426 is rotated as appropriate for the characteristics of the feed material and the first perforation pattern. Similarly, the second perforation pattern associated with the second perforation region 466 allows liquids and more coarse particulate material to pass through the screen structure 450. The second material displacement rate is thus also predetermined and the rate at which the screen assembly 426 is rotated as appropriate for the characteristics of the feed material and the second perforation pattern.

In practice, the first material displacement rate may be high relative to the second material displacement rate and still allow much of the liquid and fine particulate material to be removed from the feed material along the first perforation region 464. After the feed material has moved along the first perforation region 464, however, much of the liquid and fine particulate material has been removed from the feed material.

Predetermining the second material displacement rate such that it is less than the first material displacement rate allows the material more time within the second perforation region 466. The second material displacement rate thus allows more of the remaining liquid and the coarse particulate material to be removed through the second perforation region 466 of the screen structure 450. The use of two different material displacement rates thus allows an overall length of the system 420 to be kept to a minimum.

While the example hybrid rotary screen separator 420 employs two different perforation regions 464 and 466 and associated collection chambers 470 and 480, more than two different stages each comprising a perforation region and collection chamber may be provided for a particular operating environment. In this case, the spacings associated with each of the vane structures and the perforation patterns associated with each of the perforation regions would be predetermined to remove more particulate material of three different maximum sizes from the feed material. Typically, but not necessarily, the size of the particulate material will increase and the material displacement rate will decrease during each successive stage.

In addition, although the example hybrid rotary screen separator 420 employs two different perforation regions 464 and 466 with two different mesh sizes, a significant portion of the benefits of the use of two different regions can be obtained using a single mesh size. By the time the material being process passes from the first perforation region 464 to the second perforation region 466, much of the water within the processed material has been removed. The relatively smaller spacing between each of the adjacent vane structures in the second perforation allow the more time for the relatively smaller volume of fluid by percentage in the processed material within the second perforation region 466 to pass through the perforations, regardless of the size of the perforations relative to those of the first perforation region.

As perhaps best shown in FIGS. 13-16, the example feed assembly 458a comprises a feed housing 520, a feed lid 522, and an inlet fitting 524. The example feed housing 520 is supported relative to the housing assembly 422 and the screen assembly 426 by a bottom support member 526 and a pair of top support members 528 as shown in FIG. 13.

The feed housing 520 defines a feed chamber 530, an inlet opening 532, and an outlet opening 534. As shown in FIG. 13, the feed chamber defines an inlet portion 540 in direct communication with the inlet opening 532, a proximal portion 542, and a distal portion 544 in direct communication with the outlet opening 534.

Figure 15:
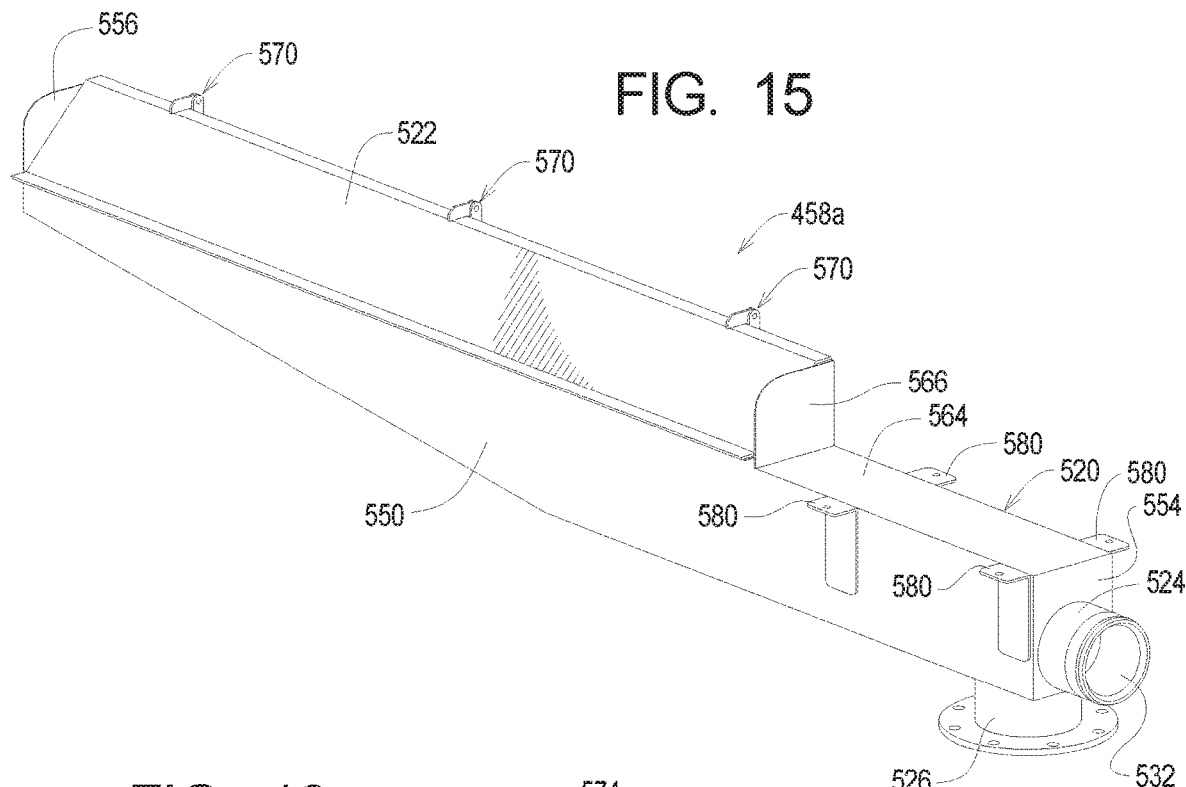
FIG. 15 is perspective view depicting a feed assembly of the third example rotary screen separator.
Figure 16:
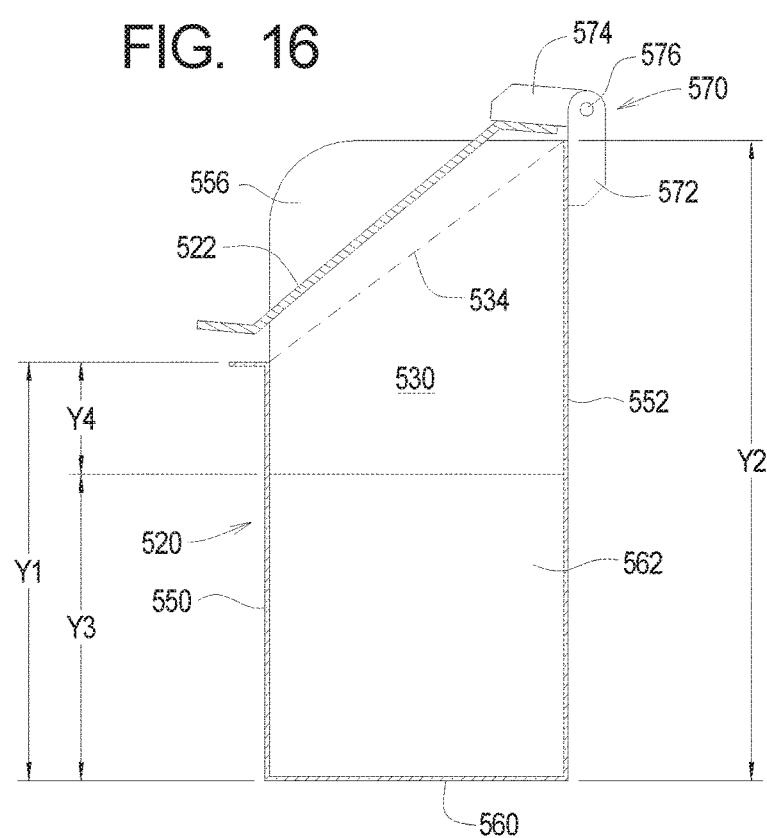
FIG. 16 is an enlarged section view similar to a portion of the perspective view depicted in FIG. 14.

As perhaps best shown in FIGS. 15 and 16, the feed housing 520 comprises first and second side walls 550 and 552, a proximal end wall 554, a distal end wall 556, first and second bottom walls 560 and 562, a top wall 564, and a transition wall 566. In the example feed housing 520, the inlet fitting 524 is secured to the proximal end wall 554 to define the inlet opening 532. The outlet opening 534 is defined by the first side wall 550, the second side wall 552, the distal end wall 556, and the transition wall 566.

FIG. 15 further illustrates that the example feed assembly 458a employs first, second, and third hinge assemblies 570 to rotatably attach the feed lid 522 to the feed housing 520 to allow the feed lid 522 to rotate from a closed position in which the outlet opening 534 is closed and through a continuum of open positions relative to the outlet opening 534 (see, e.g., FIG. 16). In particular, each of the example hinge assemblies 570 comprises a hinge support 572 secured to the first side wall 550, a hinge flange 574 secured to the feed lid 522, and a hinge pin 576. FIG. 15 further illustrates that the example feed assembly 458a comprises mounting flanges 580 to facilitate attachment of the feed housing 522 to the top support members 528.

During normal use, the first bottom wall 560 is substantially aligned with the system axis A, and the second bottom wall 562 extends upwards at an angle of a relative to the first bottom wall 560. Further, the first bottom wall 560 underlies the inlet portion 540 and the proximal portion 542 of the feed chamber 530, and the second bottom wall 562 underlies the distal portion 544 of the feed chamber 530.

As shown in FIG. 13, a length of the proximal portion 542 along the system axis A is identified as length X1, and a length of the distal portion 544 along the system axis A is identified as length X2. FIG. 16 represents vertical depths of the first and second side walls 550 and 552 relative to the first bottom wall 560 as distances Y1 and Y2, respectively. Further, because the second bottom wall 562 is angled with respect to the first bottom wall 560, an edge of the second bottom wall 562 that engages the distal end wall 556 is above the first bottom wall by a distance Y3. FIG. 16 further illustrates that, in the example feed housing 520, the first side wall 550 is greater than the dimension Y3 by a distance Y4.

Given the dimensions as described above, it can be seen that the example feed chamber 530 has a consistent cross-sectional area through the proximal portion 542 and then a decreasing cross-sectional area through the distal portion 544. Further, it can be seen from FIG. 16 that gravity will force the feed lid 522 into its closed position such that the outlet opening 534 is normally closed. Accordingly, feed material that enters the inlet opening 532 and passes through the inlet portion 540 will tend to fill the feed chamber 530 to the level of the distance Y1 before engaging the feed lid 522. At that point, further displacement of feed material through the inlet opening 532 will force the feed lid 522 up against the force of gravity such that the feed material exits the outlet opening 534. Further the varying dimensions (e.g., cross-sectional area) of the feed chamber controls the amount of feed material that exits the outlet opening 534 and ensures that the feed material drops onto the screen assembly 426 in a desired fashion.

FIG. 13 also illustrates that the second vane structures 462 are larger than the first vane structures 460. In particular, the first vane structures 460 define a first vane depth VD1 (e.g., height from bottommost portion of the screen assembly 426) while the second vane structures 462 define a second vane depth VD2 (e.g., height from bottommost portion of the screen assembly 426). The use of the larger second vane structures 462 allows material being processed within the example separator system 420 to dam or back up within the first perforation region 464 before flowing over the second vane structures and into the second perforation region 466. This allows the axis A to be substantially horizontal, or at most slightly inclined upwardly a few degrees (e.g., 0-5 degrees), from the input end 454 to the outlet end 456 to hold the material being processed within the first perforation region 464 for optimal processing before the material being processed is introduced into the second perforation region 466.

In particular, the feed assembly 458*a* distributes the feed material onto the screen assembly 426 and along the system axis A in a distribution pattern. In use, the parameters of the distribution pattern depend on of factors such as the nature of the feed material, the desired processing rate, and the parameters of the screen assembly 426. The dimensions of the feed structure 458*a* may be varied to obtain a desired distribution pattern for a particular installation of the example separator system 420.

Figure 17:
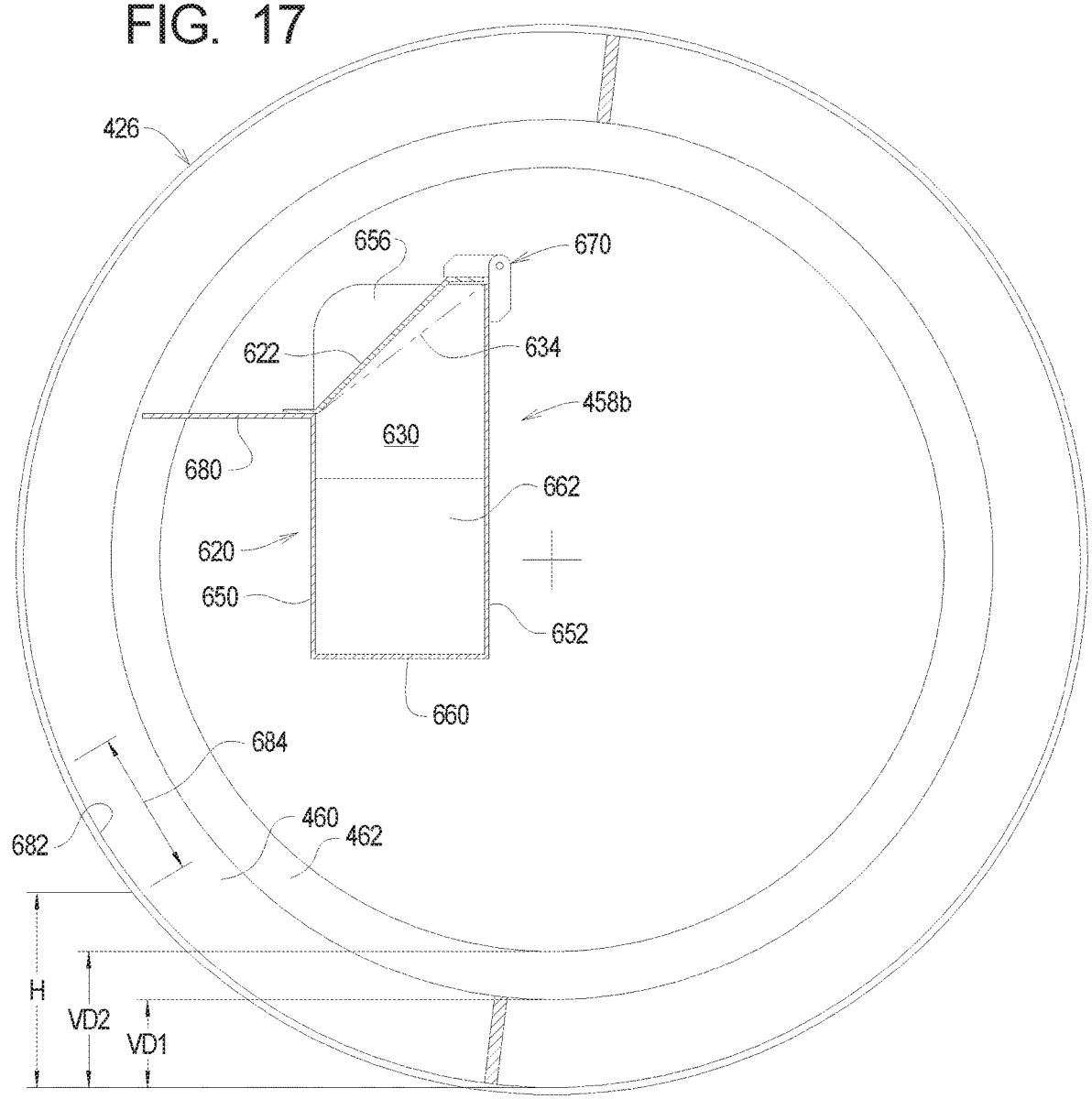
FIG. 17 is a cutaway side view of the third example rotary screen separator using another example feed system.

Referring now to FIG. 17 of the drawing, depicted therein is an example feed assembly 458*b* that may be used in place of the feed assembly of any of the example separator systems described herein. The example feed assembly 458*b* is shown in FIG. 17 as being used as part of the example separator system 420 described above.

The example feed assembly 458*b* comprises a feed housing 620, a feed lid 622, and an inlet fitting (not visible in FIG. 17). The example feed housing 620 is supported relative to the housing assembly (not shown in FIG. 17) and the screen assembly 426 by a bottom support member and a pair of top support members in a manner similar to that of the example feed assembly 458*a* described above.

The feed housing 620 defines a feed chamber 630, an inlet opening (not visible in FIG. 17), and an outlet opening 634. Like the feed chamber 530 described above, the feed chamber 630 defines an inlet portion in direct communication with the inlet opening, a proximal portion, and a distal portion in direct communication with the outlet opening 634.

The example feed housing 620 comprises first and second side walls 650 and 652, a proximal end wall (not visible in FIG. 17), a distal end wall 656, first and second bottom walls 660 and 662, a top wall (not visible in FIG. 17), and a transition wall (not visible in FIG. 17). The outlet opening 634 is defined by the first side wall 650, the second side wall 652, the distal end wall 656, and the transition wall.

The example feed assembly 458*b* employs hinge assemblies 670 to rotatably attach the feed lid 622 to the feed housing 620 to allow the feed lid 622 to rotate from a closed position in which the outlet opening 634 is closed and through a continuum of open positions relative to the outlet opening 634. The example feed assembly 458*b* further comprises mounting flanges (not shown in FIG. 17) to facilitate attachment of the feed housing 620 to the top support members (not shown in FIG. 17).

FIG. 17 further illustrates that the example feed housing 620 further comprises an extension flange 680 that extends substantially orthogonally from the first side wall 650 immediately below the lowermost portion of the outlet opening 634.

The example feed housing 620 functions in much the same manner as the example feed housing 520 described above. However, the extension flange 680 causes material flowing out of the outlet opening 634 to fall or cascade in a lateral direction such that the material flowing out of the outlet opening lands at a lateral location of the screen assembly instead of at a bottom portion of the screen assembly. In the context of the example separator system 420, the material falling or cascading from the extension flange 680 impinges on an inner surface 682 of the screen assembly 426 at a location 684 that, under most operating conditions, will be, at its lowest point, at a height H above the first and second vane structures 460 and 462 when measured from a bottom most point of the screen assembly 426. Any water in the material falling or cascading off of the extension flange 680 will thus contact the inner surface 682 above the level of material being processed by the separator system 420 under normal conditions. The water contacting the inner surface will rinse the inner surface 682 of the screen structure 426 as it rotates, thereby improving the separating function of the separator system 420. The exact location 684 will vary depending on the nature of the material flowing out of the outlet opening 634.

Figure 18:
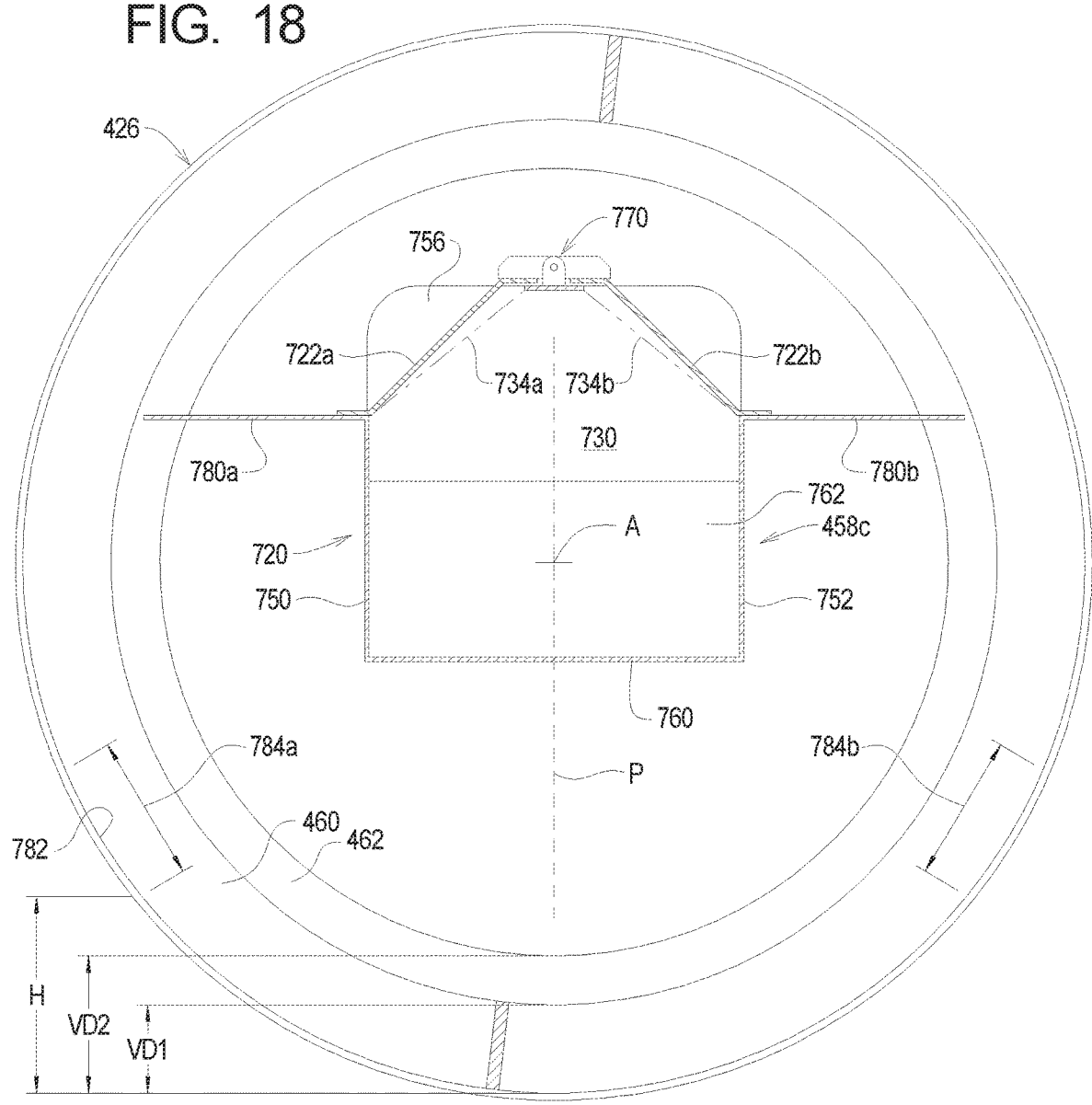
FIG. 18 is a cutaway side view of the third example rotary screen separator using another example feed system.

Referring now to FIG. 18 of the drawing, depicted therein is an example feed assembly 458*c* that may be used in place of the feed assembly of any of the example separator systems described herein. The example feed assembly 458*c* is shown in FIG. 18 as being used as part of the example separator system 420 described above.

The example feed assembly 458*c* comprises a feed housing 720, first and second feed lids 722*a* and 722*b*, and an inlet fitting (not visible in FIG. 18). When used as part of the example separator system 420 described above, the example feed housing 720 is supported relative to the housing assembly 422 and the screen assembly 426 by a bottom support member and a pair of top support members in a manner similar to that of the example feed assembly 458*a* described above. However, the volume defined by example feed housing 720 is larger than that defined by the example feed housing 620 and is substantially symmetrically arranged about a vertical plane P extending through the axis A of the separator system 420.

The feed housing 720 defines a feed chamber 730, an inlet opening (not visible in FIG. 18), and first and second outlet openings 734*a* and 734*b*. Like the feed chamber 530 described above, the feed chamber 730 defines an inlet portion in direct communication with the inlet opening, a proximal portion, and a distal portion in direct communication with the outlet openings 734*a* and 734*b*.

The example feed housing 720 comprises first and second side walls 750 and 752, a proximal end wall (not visible in FIG. 18), a distal end wall 756, first and second bottom walls 760 and 762, a top wall (not visible in FIG. 18), and a transition wall (not visible in FIG. 18). The first and second outlet openings 734*a* and 734*b* are symmetrically arranged on either side of the plane extending through the axis A.

The example feed assembly 458*c* employs hinge assemblies 770 to rotatably attach the feed lids 722*a* and 722*b* to the feed housing 720 to allow the feed lids 722*a* and 722*b* to rotate, independently, from closed positions in which the outlet openings 734*a* and 734*b*, respectively, are closed and through a continuum of open positions relative to the outlet opening 734a and 734b. The example feed assembly 458c comprises mounting flanges (not shown in FIG. 18) to facilitate attachment of the feed housing 720 to the top support members (not shown in FIG. 18).

FIG. 18 further illustrates that the example feed housing 720 further comprises first and second extension flanges 780a and 780b that extend substantially orthogonally from the first and second side walls 750 and 752 immediately below the lowermost portion of the first and second outlet openings 734a and 734b, respectively.

The example feed housing 720 functions in much the same manner as the example feed housings 520 and 620 described above. However, the extension flanges 780a and 780b cause material flowing out of two of the outlet openings 734a and 734b and also to cause material flowing along the extension flanges 780a and 780b to fall or cascade onto an inner surface 782 of the screen assembly 426 in first and second lateral directions to fall at first and second opposite lateral locations 784a and 784b of the screen assembly 426 instead of at a bottom portion of the screen assembly 426. In the context of the example separator system 420, the opposing lateral locations 784a and 784b are at a height H spaced above a height either of the first and second vane structures 460 and 462 when measured from a bottom most point of the screen assembly 426. Any water in the material falling or cascading off of the extension flanges 780a and 780b will thus rinse the inner surface 782 of the screen structure 426 at the locations 784a and 784b as the screen structure 426 rotates, thereby improving the separating function of the separator system 420.

Figure 19:
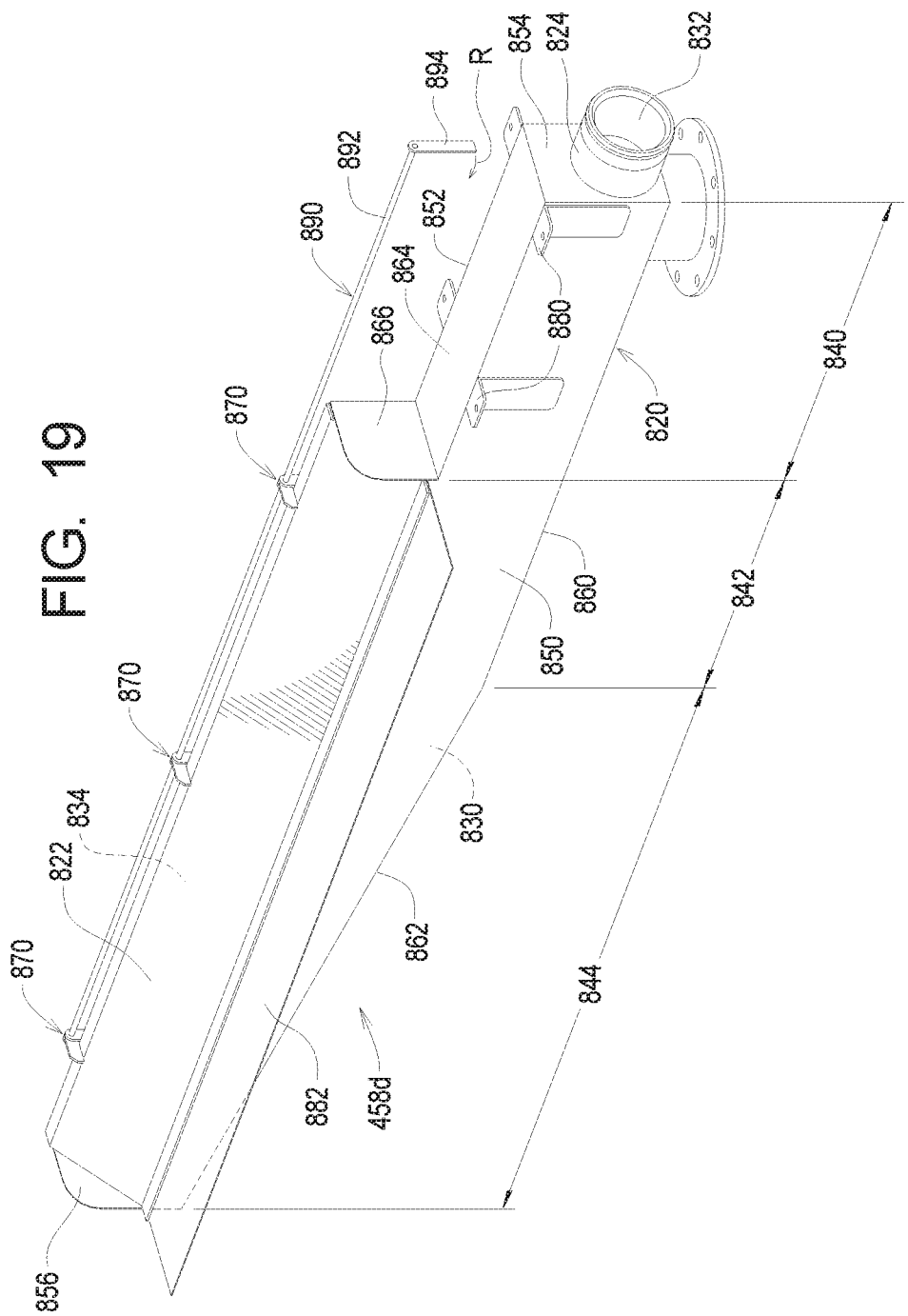
FIG. 19 is a perspective view depicting another example feed assembly that may be used by the third example rotary screen separator.

Referring now to FIG. 19 of the drawing, depicted therein is an example feed assembly 458d that may be used in place of the feed assembly of any of the example separator systems described herein. The example feed assembly 458d is shown in FIG. 19 as being used as part of the example separator system 420 described above.

The example feed assembly 458d comprises a feed housing 820, a feed lid 822, and an inlet fitting 824. The example feed housing 820 is supported relative to the housing assembly 422 and the screen assembly 426 by a bottom support member and a pair of top support members in a manner similar to that of the example feed assembly 458a described above.

The feed housing 820 defines a feed chamber 830, an inlet opening 832, and an outlet opening 834. The feed chamber defines an inlet portion 840 in direct communication with the inlet opening 832, a proximal portion 842, and a distal portion 844 in direct communication with the outlet opening 834.

The example feed housing 820 comprises first and second side walls 850 and 852, a proximal end wall 854, a distal end wall 856, first and second bottom walls 860 and 862, a top wall 864, and a transition wall 866. In the example feed housing 820, the inlet fitting 824 is secured to the proximal end wall 854 to define the inlet opening 832. The outlet opening 834 is defined by the first side wall 850, the second side wall 852, the distal end wall 856, and the transition wall 866.

The example feed assembly 458d employs hinge assemblies 870 to rotatably attach the feed lid 822 to the feed housing 820 to allow the feed lid 822 to rotate from a closed position in which the outlet opening 834 is closed and through a continuum of open positions relative to the outlet opening 834. The example feed assembly 458d comprises mounting flanges 880 to facilitate attachment of the feed housing 822 to the top support members (not shown in FIG. 19).

FIG. 19 further illustrates that the example feed housing 820 further comprises an extension flange 882 that extends substantially orthogonally from the first side wall 850 immediately below the lowermost portion of the outlet opening 834.

Additionally, the example feed housing 820 comprises a crank assembly 890 comprising a rod 892 and a handle 894. The rod 892 is operatively connected to the feed lid 822 and the handle 894 such that rotation of the handle 894 as shown by arrow R in FIG. 19 causes the feed lid 822 to move from the closed position to an open position.

The example feed housing 820 functions in much the same manner as the example feed housing 520 described above. However, the extension flange 880 causes material flowing out of the outlet opening 534 to fall or cascade at a lateral location of the screen assembly instead of at a bottom portion of the screen assembly. In the context of the example separator system 420, the material falling or cascading from the extension flange 880 impinges the inner surface of the screen assembly 426 at a location above a height of the first vane structures 460 when measured from a bottom most point of the screen assembly 426. Any water in the material falling or cascading off of the extension flange 880 will thus rinse the inner surface of the screen structure 426 as it rotates to improve the separating function of the separator system 420.

In addition, the crank assembly 890 allows the feed lid 822 to be manually opened when feed material clogs the feed housing 820 such that the feed lid 822 does not open during normal operation. A crank assembly such as the example crank assembly 890 may be used with the example feed assembly 458b to open the lid 622. In addition, one or two crank assemblies the same as or similar to the crank assembly 890 may be used with the example feed assembly 458c to open the lids 722a and 722b, either independently or simultaneously.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of the invention.

The embodiments of the invention in which an exclusive property or privilege is claimed are defined as follows:

1. A method for separating liquid from solid matter within feed material comprising an admixture of such liquid and solid matter, the method comprising:

introducing a flow of the feed material into a feed chamber, the feed chamber comprising a first side wall, a proximal wall and a bottom wall, the feed material entering through an inlet opening the proximal wall defines, the feed chamber further defining an outlet opening extending downward to an upper edge of the first side wall the feed chamber comprises, the upper edge of the first side wall defining an overflow height, Y1, over a lowest point the feed chamber defines;

allowing the flow of feed material to continue out of the feed chamber thereby to flow over the upper edge of the first side wall, the flow urging a feed lid hingedly attached to a feed housing to rotate from a closed position to at least one open position in response to feed material flowing from the feed chamber over the upper edge of the first side wall, the feed lid weighing a feed lid weight, the feed lid weight urging the feed lid downward thereby modulating the flow of feed material;

rotating a screen structure a cylindrical rotary screen comprises, defining a longitudinal axis, an input port, an output port, a perforation region and entirely enclosing the feed chamber such that the lowest point the feed chamber defines coincides with a lateral location; and receiving the flow of feed material flowing over the upper edge of the first wall at the perforated region thereby causing the perforated region to divert some portion of the solid matter along an inner surface of the screen structure while allowing liquid to pass through perforations in the perforated region.

2. The method of claim 1 for separating liquid from solid matter within feed material comprising an admixture of such liquid and solid matter, the method further comprising:

motivating solid matter along the inner surface of the screen structure thereby imparting lateral movement by rotation of a first vane structure arranged within the screen structure to contact the inner surface, the vane structure having a vane height less than that of the lateral location when measured from a bottom-most point of the vane structure.

3. The method of claim 1 for separating liquid from solid matter within feed material comprising an admixture of such liquid and solid matter, wherein:

allowing the flow of feed material to continue out of the feed chamber thereby to flow over the upper edge of the first wall, further includes supplying a flange, extending horizontally from the first wall a flange width, the flange diverting the flow of feed material, displacing that flow from a vertical plane that contains the defined longitudinal axis of the screen structure.

4. The method of claim 1 for separating liquid from solid matter within feed material comprising an admixture of such liquid and solid matter, wherein:

urging a feed lid rotatably attached to the feed housing to rotate from a closed position to feed material flowing from the feed chamber over the upper edge of the first side wall, the feed lid having a feed lid weight bearing onto the flow of feed material, further includes adjusting the feed lid weight to further modulate the flow of feed material.

5. The method of claim 1 for separating liquid from solid matter within feed material comprising an admixture of such liquid and solid matter, wherein:

introducing a flow of the feed material into a feed chamber through an inlet opening, includes the feed chamber defining a second outlet opening extending downward to an upper edge of a second side wall the feed chamber comprises, the upper edge of the second side wall being located at the overflow height, Y1; and urging a second feed lid rotatably attached to the feed housing to rotate from a closed position to feed material flowing from the feed chamber over the upper edge of the second side wall, the second feed lid having a second feed lid weight bearing onto the flow of feed material.

6. A method for feeding feed material comprising an admixture of liquid and solid matter into a rotary screen separator, the method comprising:

feeding the admixture through an inlet opening a feed housing enclosing a feed chamber defines, the feed housing comprising a first bottom wall, a first side wall, a second side wall, a proximal wall and a distal wall, the feed housing further defining an outlet opening extending from the first side wall to the second side wall, the feed housing further comprising a feed lid, the feed lid being hingedly affixed to the second side wall such that gravity urges the feed lid into a closed position when the feed chamber is empty such that the feed lid rests on a top edge of the first side wall;

receiving the feed material in the feed chamber, there to accumulate in a sufficient quantity to overtop the first side wall and thereby to press the feed lid against gravity to raise the feed lid from its closed position against the force of gravity such that the feed material exits through the outlet opening in a flow of feed material over the top edge of the first side wall;

modulating the flow of the feed material over the top edge of the first side wall against feed lid as gravity urges the feed lid downward towards the top edge of the first side wall; and receiving the flow of feed material on an inner surface of a screen structure for separating liquid from the flow of feed material, the screen structure cylindrically enclosing the feed housing.

7. The method of claim 6, wherein the modulating the flow of feed material further comprises adjusting the feed lid weight to further modulate the flow of feed material.

8. The method of claim 6, wherein modulating the flow of feed material over the top edge of the first side wall further comprises allowing the flow of feed material to continue out of the feed chamber thereby to flow over the upper edge of the first wall, further includes supplying a flange, extending horizontally from the first wall a flange width, the flange diverting the flow of feed material, displacing that flow from a vertical plane that contains the defined longitudinal axis of the screen structure.

9. The method of claim 6 wherein the receiving the flow of feed material on an inner surface of a screen structure includes motivating solid matter along the inner surface of the screen structure thereby imparting lateral movement by rotation of the first vane structure arranged within the screen structure to contact the inner surface, the vane structure having a vane height less than that of the lateral location when measured from a bottom-most point of the vane structure.

10. The method of claim 6, further comprising:

receiving the feed material in the feed chamber, includes the feed chamber further defining a second outlet opening; and urging a second feed lid rotatably attached to the feed housing to rotate from a closed position to an open position in response to a second flow of feed material flowing from the feed chamber over an upper edge of the second side wall of the housing, the second feed lid bearing onto the second flow of feed material to modulate that second flow.

* * * * *